United States Patent
Dasher et al.

(10) Patent No.: US 12,541,253 B2
(45) Date of Patent: Feb. 3, 2026

(54) SYSTEMS AND METHODS FOR PROVIDING PARENTAL CONTROLS FOR HMD CONTENT

(71) Applicant: Adeia Guides Inc., San Jose, CA (US)

(72) Inventors: Charles Dasher, Lawrenceville, GA (US); Dhananjay Lal, Englewood, CO (US); Reda Harb, Tampa, FL (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 2 days.

(21) Appl. No.: 18/636,477

(22) Filed: Apr. 16, 2024

(65) Prior Publication Data

US 2025/0321638 A1    Oct. 16, 2025

(51) Int. Cl.
  *G06F 3/01*    (2006.01)
  *G06F 3/16*    (2006.01)

(52) U.S. Cl.
  CPC .............. *G06F 3/015* (2013.01); *G06F 3/017* (2013.01); *G06F 3/167* (2013.01)

(58) Field of Classification Search
  CPC ........... G06F 3/015; G06F 3/017; G06F 3/167
  USPC ....................................................... 345/156
  See application file for complete search history.

(56) References Cited

U.S. PATENT DOCUMENTS

| 11,861,255 | B1 | 1/2024 | Ive et al. | |
|---|---|---|---|---|
| 2021/0240279 | A1* | 8/2021 | Harviainen | G06F 3/017 |
| 2022/0387128 | A1* | 12/2022 | Bail | H04N 13/279 |
| 2023/0162450 | A1* | 5/2023 | Gutensohn | G06F 3/011 |
| | | | | 345/633 |

OTHER PUBLICATIONS

Artuso, J., et al., "Combining VR and Neurotechnology with OpenBCI's Galea", Varjo, available online at: <https://varjo.com/vr-lab/combining-vr-and-neurotechnology-with-openbcis-galea/>, Nov. 15, 2022, 4 pages.

Facebook Reality Labs Research, "Display systems research: Reverse passthrough VR", META, available online at: <https://research.facebook.com/blog/2022/8/display-systems-research-reverse-passthrough-vr/>, Aug. 2, 2021, 4 pages.

Hubbard, R., et al., "Enhancing learning through virtual reality and neurofeedback: a first step", LAK '17: Proceedings of the Seventh International Learning Analytics & Knowledge Conference, Mar. 13, 2017, pp. 398-403.

Kaushik, P., et al., "Decoding the cognitive states of attention and distraction in a real-life setting using EEG", Scientific Reports, vol. 12, Article No. 20649, Nov. 30, 2022, 10 pages.

(Continued)

*Primary Examiner* — Calvin C Ma
(74) *Attorney, Agent, or Firm* — HG LAW LLP

(57) ABSTRACT

Systems and methods are provided for implementing parental controls for extended reality (XR) content provided to a first user wearing a head-mounted device (HMD) or an XR device of any form. A second user is detected in a vicinity of the HMD in an external environment of the HMD. Based on determining that the second user in the vicinity of the HMD is an authorized user with respect to the first user, a visual representation associated with the XR content is generated for display on an external display of the HMD that is visible from the external environment of the HMD. An option is provided to enable the XR content to be modified based on input from the second user.

20 Claims, 12 Drawing Sheets

(56) References Cited

OTHER PUBLICATIONS

Patently Apple, Description of Apple's Patent on EyeSight Feature, Available online at: <https://www.patentlyapple.com/2024/01/apple-wins-patent-for-vision-pros-external-display-communications-system-that-includes-eyesight-yet-reveals-other-projectable.html>, retrieved on Jun. 24, 2024, 10 pages.

Selinger, C., "Types Of Attentional Focus", Themba Tutors, available online at: <https://thembatutors.com/types-of-attentional-focus/>, retrieved on Jun. 24, 2024, 3 pages.

* cited by examiner

SYSTEMS AND METHODS FOR PROVIDING PARENTAL CONTROLS FOR HMD CONTENT

BACKGROUND

This disclosure is directed to systems and methods for providing parental controls for head-mounted display (HMD) content.

SUMMARY

Extended reality (XR) devices provide users with virtual reality (VR) content or augmented reality (AR) content that blends aspects of the physical world with digital elements. Head-mounted displays (HMDs) are a type of XR device worn on the head of a user. HMDs provide XR content to users through a display (sometimes called a viewport) in front of the eyes of the user. However, generally only a single user can use the HMD at a given time. Given the private nature of an HMD viewport, parents of children using XR devices, particularly HMDs, may struggle to monitor what content their children are consuming. Children may attempt to take advantage of this semblance of privacy and consume content via the HMD that they would not ordinarily consume while being observed by a parent or guardian (or where they feel a parent or guardian might check in on them, e.g., in a child's bedroom). In one approach, a parent can set certain settings based on parental rating, e.g., to block the child from accessing content or applications with a mature rating. However, some parents and/or children might find these restrictions to be too rigid. For example, a parent may block content with a mature rating from their child. A first content item might have a mature rating because it includes a scene showing alcohol consumption, while a second content item might have a mature rating because it includes scenes with violence. The parent might not mind if their child is exposed to a scene with alcohol consumption but might care if their child is exposed to a scene with violence displayed. However, in the above approach, both movies are blocked when the parent wants only one movie blocked (e.g., the movie showing violence). Thus, the parent is completely reliant on the content provider's predefined ratings for a content or application in determining what their child may or may not access.

Similarly, in the above approach, a child may be blocked from accessing content that includes only a short portion of maturely rated content, even if the rest of the content is otherwise appropriate for a child. However, this may be undesirable for a parent that may be willing to allow their child to consume this content as it includes only a small amount of mature content.

In another approach, a parent may require a PIN to be entered in order for particular applications or content to be accessed. However, for a child interacting with other users in a virtual world, e.g., with other avatars, this may be inadequate, as it is difficult for the parent to predict what other users in the virtual world might say or do when interacting with the child. While the parent can block any access of the child's to the virtual world application or other application (e.g., YouTube), this approach is inflexible, as there might be certain portions of the virtual world (e.g., a study group) and/or certain content available on YouTube that is permissible and beneficial for the child to have access to while using the HMD. While a parent of a child using an HMD could ask the child what they are currently watching or could take the HMD from the child to see what the child is accessing on the HMD, this is potentially time-consuming and burdensome for the parent and child and interrupts the XR session of the child. There is a need for improved techniques for implementing parental controls in the context of an HMD XR environment.

To help address these problems, the systems, methods, and apparatuses disclosed herein may be configured to provide XR content via an HMD to a first user. In some embodiments, as disclosed herein, the HMD is worn by the first user. The disclosed techniques include detecting that a second user is in a vicinity of the HMD in an external environment of the HMD and determining whether the second user is an authorized user with respect to the first user. Such aspects ensure that only users recognized by the HMD, e.g., parents or guardians of a child using the HMD, can access the content provided via the HMD. Unauthorized users may not have access to the content provided via the HMD. Based on determining that the second user in the vicinity of the HMD is an authorized user with respect to the first user, the disclosed techniques cause generating for display, on an external display of the HMD that is visible from the external environment of the HMD, a visual representation associated with the content. For example, the system may generate for display, on the external display of the HMD, the logo of the app currently being provided to or used by the child. Such aspects allow an authorized user, e.g., a parent or guardian of a child using an HMD, to receive an indication in real time of the content being provided to the first user via the HMD without interrupting the first user, and to modify such content, e.g., cause the application to be exited out of, or cease playing content, if the second user deems such content inappropriate or otherwise undesirable for the first user using the HMD. Such features help improve the accessibility and understandability of content being accessed via the HMD to external users, thereby facilitating better communication and interaction in XR environments by bridging the gap between virtual activities and real-world social interactions. Such features enhance the integration of XR headsets into everyday life, offering a more intuitive and socially aware user experience.

The disclosed techniques include providing an option to enable the content to be modified based on input from the second user. In some embodiments, the input to modify the content is a voice command to cease providing the content to the first user. In some embodiments, a system receives the input from the second user via the external display. For example, the external display of the HMD may receive an input such as a fingerprint from an authorized user and cease providing the content. In some embodiments, a system receives the input from the second user via a gesture instructing the HMD to cease providing the content to the first user. For example, a camera of the HMD may detect a hand motion from an authorized user indicating to exit the app currently in use by the first user. Such aspects allow the HMD to provide appropriate content to the first user.

In some embodiments, the system may modify the content being provided to the first user by causing the HMD to skip a particular segment of a content item. For example, the system may skip a segment in a movie that includes mature subject matter. In some embodiments, the system may modify the content being provided to the first user by replacing mature content with appropriate content or ceasing the providing of the content entirely. Such aspects allow the authorized user to control the content the first user is provided and to stop the content from being provided if the authorized user deems the content inappropriate for the first user. In some embodiments, the visual representation associated with the content comprises at least one of the content being provided to the first user, one or more images of the content, a parental control rating of the content, or metadata of the content. For example, the visual representation may comprise a logo of the app(s) currently being used by the user of the HMD and a description of the app. Additionally, icons of consumer apps that are open or running in the background (i.e., the first user is not actively engaging) may also be displayed on the external display of the HMD. Such aspects allow the HMD to provide more detail of the provided content to the authorized user.

In some implementations, the system generates for display, at a user interface of a device of the second user, the visual representation of the content. For example, a computing device, e.g., a smartphone, belonging to the second user, e.g., a parent, generates for display the visual representation associated with the content provided to the first user. In some embodiments, the input received from the second user to modify the content being provided via the HMD is received via the device of the second user. Such aspects allow the second user to observe and control the content provided to the first user without needing to be physically near the HMD. In some embodiments, the system records, during a period of time comprising a plurality of timepoints, a plurality of events occurring within a viewport of the HMD while the first user is wearing the HMD, wherein the plurality of events relate to content provided via one or more applications to the first user, or applications that were invoked or interacted with by the first user (e.g., texting apps, social networking apps, Internet browsers, etc.). This may include interaction with notifications associated with different applications. For example, the system may take a screenshot and/or video each time the HMD opens a new application, switches between applications, and/or selects new content within an application. The system, in some implementations, generates for display, at the user interface of the device of the second user, a timeline of the plurality of events.

The system, based on receiving selection of a particular timepoint of the plurality of timepoints of the timeline, may generate for display, at the user interface of the device of the second user, an image or a video of a particular event of the plurality of events that occurred within the viewport at the particular timepoint. Such aspects allow a parent insight into the VR content their child has consumed. In some embodiments, the system may provide a recap over a certain period of time of the first user's activity in the HMD, e.g., short clips and/or screenshots of the first user's interactions with applications in the HMD, to permit the second user to browse the first user's activity over a period of time (e.g., an hour, a day, or any other suitable period of time). In some embodiments, the system determines whether a timer (e.g., a refresh timer) has expired. For example, the refresh timer may represent a timer interval after which certain content (e.g., an image of a timepoint on the timeline) is refreshed on the external display of the HMD and/or the device of the second user. Based on determining that the timer has expired, the system may generate for display, at the user interface of the device of the second user, an image of another event of the plurality of events that occurred within the viewport at a different timepoint, instead of the image of the particular event that occurred at the particular timepoint. For example, if the refresh timer is configured to notify the system when particular content has been displayed to the second user for one minute, upon determining that the particular content has been displayed for a minute, the system may cease display of a first image, e.g., associated with YouTube, and generate for display a second image, e.g., associated with Netflix. Such aspects allow for a parent to receive updated information on the content currently being provided to their child via the HMD.

In some implementations, the system determines an attentional focus level of the first user. The system may determine the attentional focus level of the first user based on sensor data of the first user obtained via a sensor of the HMD. For example, an electroencephalogram (EEG) sensor may measure brain waves of the first user. In some embodiments, the system determines the attentional focus level of the first user based on an identified category of the content being provided via the HMD to the first user. For example, content categorized as a work application typically requires a larger cognitive load for the first user than content categorized as entertainment. The first user may also have a longer response time to external stimulus while accessing a work application, due to a higher attentional focus level, than when the user is accessing an entertainment application. User preferences and user history may also be taken into account by the system in determining the attentional focus level of the first user.

In some embodiments, the visual representation associated with the content, generated for display by the system, comprises an indication of the attentional focus level of the first user to indicate whether the first user is available to interact with the second user. The system may provide a first type of visual representation when the first user is available to interact with the second user and a second type of visual representation, different from the first type of visual representation, when the first user is not available to interact with the second user. For example, the system may display, on the external display of the HMD, an indicator that the first user is busy and the logo of the app currently in use by the first user (e.g., Zoom).

In some implementations, the system determines that the second user is requesting to interact with the first user. For example, a parent wants to get the attention of their child who is currently using an HMD. The system, based on determining that the attentional focus level of the first user is above an attentional focus level threshold, may queue, for later notification to the first user, an indication of the request from the second user. For example, based on determining that the child has a high attentional focus level due to being in a school Zoom meeting, the system may display a busy indication on the external display of the HMD without disrupting the first user. Based on determining, at a later time, that the attentional focus level of the first user is below the attentional focus level threshold, the system may provide the indication associated with the queueing to the first user. For example, after determining that the Zoom meeting has ended and the child is now perusing social media, the system may pause the content being provided to the child (and/or stop providing such content to the child) and provide a notification to the child indicating that their parent has requested their attention. In some embodiments, the system pauses the content and informs the child that their parent has requested their attention regardless of whether the parent is still within a threshold distance of the child, for example, if the parent has left the vicinity of the child using the HMD, e.g., to go to a different room of the house. Alternatively, in some embodiments, the indication associated with the queuing may only be provided to the child user if the parent user is in the child's vicinity, e.g., if the parent remains in the child's vicinity until the child is ready to interact, or upon detecting the next or later instance when the parent enters the child's vicinity.

The system may intelligently display indications on the external display of the HMD and/or on the user interface of the device of the second user by taking into account the category of the content, user preferences, historical user activity, and/or sensor data from the HMD (e.g., variables of the attentional focus level of the first user). Such aspects allow the system to provide the second user with a granular look into the content being provided to the first user via the HMD without unnecessarily disrupting the attentional focus of the first user.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1A:
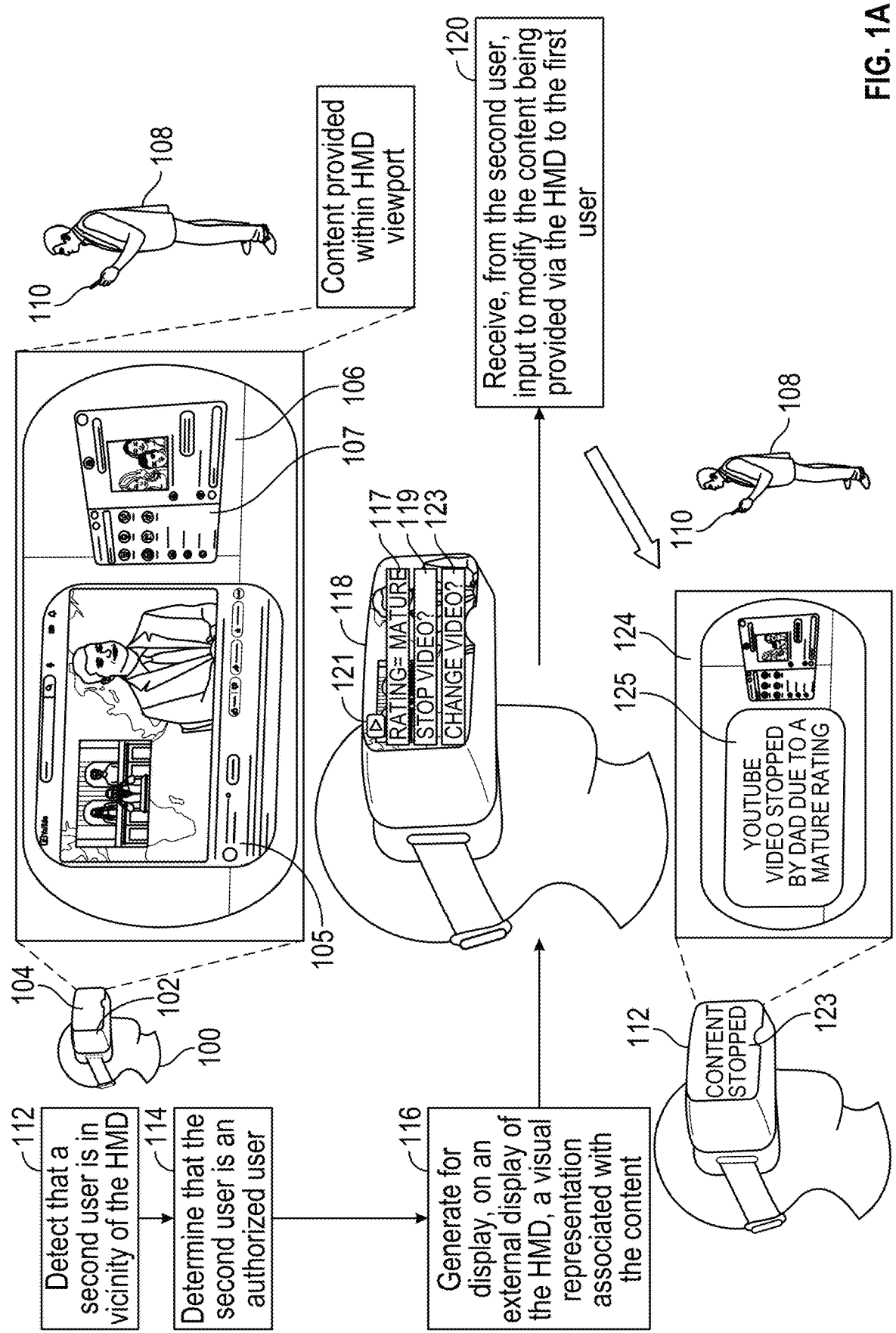
FIG. 1A shows an illustrative example of providing parental controls for HMD content, in accordance with some embodiments of this disclosure.

FIG. 1A shows an illustrative example of providing parental controls for, and/or other indications related to, content being provided via an HMD, in accordance with some embodiments of this disclosure. The parental controls for and/or indication related to content being provided via the HMD content may be provided by a system. The system may be configured to perform the functionalities described herein. In some embodiments, the system comprises or corresponds to an application that may be executed at least in part on a server (e.g., media content source 502 and/or one or more servers 504 of FIG. 5), a user equipment device (e.g., HMD 102 and/or device 110 of FIG. 1, devices 506, 507, 508, and/or 510 of FIG. 5), such as, for example, a laptop computer, a personal computer, a desktop computer, a smart television, a smart watch or wearable device, smart glasses, a stereoscopic display, a wearable camera, XR glasses, XR goggles, XR HMD, a near-eye display device, or any other suitable user equipment or computing device, or any combination thereof. The application and/or system may comprise or employ any suitable number of displays, sensors, or devices such as those described in FIGS. 1-11, or any other suitable software and/or hardware components; or any combination thereof.

XR may be understood as virtual reality (VR), augmented reality (AR) or mixed reality (MR) technologies, or any suitable combination thereof. VR systems may project images to generate a three-dimensional environment to fully immerse (e.g., giving the user a sense of being in an environment) or partially immerse (e.g., giving the user the sense of looking at an environment) users in a three-dimensional, computer-generated environment. Such environment may include objects or items that the user can interact with. AR systems may provide a modified version of reality, such as enhanced or supplemental computer-generated images or information overlaid over real-world objects. MR systems may map interactive virtual objects to the real world, e.g., where virtual objects interact with the real world, or the real world is otherwise connected to virtual objects.

In some embodiments, the system may be installed at or otherwise provided to a particular computing device, may be provided via an application programming interface (API), or may be provided as an add-on application to another platform or application. In some embodiments, software tools (e.g., one or more software development kits, or SDKs) may be provided to any suitable party, to enable the party to implement the functionalities described herein.

In some embodiments, a first user 100 wears an XR headset, e.g., HMD 102. In some embodiments, instead of wearing an HMD, the user may be wearing or using any other suitable device capable of providing XR content or other content, and the techniques described herein may be used to provide parental controls for, and/or other indications of, content being consumed via such device. HMD 102 may comprise an external display 104, which may outwardly face an environment external to HMD 102 and may be visible to users not wearing HMD 102 (e.g., within a vicinity of HMD 102). While first user 100 wears HMD 102, HMD 102 may provide to first user 100 content (e.g., content 105 and/or content 107) via one or more displays, e.g., viewport 106. For example, content 105 may be a YouTube video and content 107 may be a text messaging app. In some implementations, viewport 106 may provide VR content, AR content, live content from the physical world, video content, social media content, a virtual world, the metaverse, news applications or websites, or any other suitable content accessible via a network (e.g., the Internet), or any combination thereof. For example, HMD 102 provides first user 100 with content such as a YouTube video (e.g., content 105) by accessing via a web browser or application and a text messaging application and conversation (e.g., content 107), as shown by viewport 106. In some embodiments, HMD 102 is associated with at least one user profile. Each user profile may be accessible upon receiving input specifying a unique set of credentials and/or may be associated with a unique content history, user preferences, parental control restrictions, any other suitable data, or any combination thereof.

In some embodiments, at step 112, the system detects that a second user 108 is in a vicinity of HMD 102. The system may detect that a second user 108 is in a vicinity of HMD 102 by capturing an image of second user 108, and performing facial recognition to determine an identity of second user 108 (e.g., by extracting facial features of the face in the captured image and determining the features sufficiently match stored facial features of second user 108). The system may detect that second user 108 is within a threshold distance of HMD 102 by detecting that a device 110 of the second user, e.g., a smartphone, is within a threshold distance of HMD 102. For example, device 110 may communicate directly or over a network with HMD 102 to indicate its presence, and/or a received signal strength indicator (RSSI) may be used to determine a distance between such devices, and/or GPS or other location data may be used. As another example, one or more images may be captured by HMD 102 or device 110 and analyzed to determine a distance between such devices, and/or any other suitable number of sensors may be used (e.g., an external camera, IOT devices, motion sensors, or any other suitable sensor, or any combination thereof). In some implementations, the system detects a device of second user 108 by detecting an IP address and/or a MAC address of the device of second user 108 in the same network as HMD 102. The system may detect that second user 108 is within a threshold distance of HMD 102 by detecting a voice of second user 108.

In some implementations, at step 114, the system determines that second user 108 is an authorized user with respect to first user 100. In some embodiments, the techniques described in steps 112 and 114 may be performed as part of the same step or in conjunction. An authorized user may be a parent or guardian (or older sibling or grandparent) of first user 100 or any other suitable user with an authoritative relationship or other suitable relationship with first user 100. For example, second user 108 may be the father of first user 100. The system may determine that the second user is an authorized user with respect to first user 100 using any suitable technique(s). For example, device 110 may transmit a device identifier and/or user profile identifier associated with second user 108 to HMD 102 and/or a remote server, and the system may determine that such device identifier or user profile identifier is registered as an authoritative user for user 100. In some embodiments, the system determines that second user 108 is an authorized user with respect to first user 100 by capturing an image of second user 108 and performing facial recognition. Based on the performing the facial recognition of the captured image, the system may recognize second user 108 as authorized.

As another example, the system may determine that second user 108 is an authorized user with respect to the first user (e.g., first user 100) based on receiving and analyzing a voice command from second user 108. The system may then identify identity information of second user 108 based on the received voice command and determine, based on the identity information, that second user 108 is an authorized user with respect to first user 100. In some implementations, the system may identify identity information of the second user using speech recognition techniques such as a stored voiceprint. For example, an authorized user(s) may preset their voiceprint to be recognized as an authorized voice for HMD 102 while HMD 102 is in use by first user 100, and/or the system may recognize the voice characteristics of user 108 from previous interactions. For example, the system may have received, at a prior time (e.g., at a set up phase for HMD 102 and/or device 110), a voice sample from second user 108 and an input indicating that second user 108 is an authorized user with respect to first user 100. The system may store multiple voiceprints, for example, from a mother and a father of first user 100, or any other suitable guardian or other suitable authorized user with respect to first user 100. The system may provide an authorized user control over the content provided to the first user via HMD 102, such as providing the ability to restrict the access of user 100 via HMD 102 to content items and/or applications based on content rating, time of day, amount of time the HMD has been in use, any other suitable data, or any combination thereof.

In some implementations, at step 116, the system generates for display, on an external display (e.g., external display 104 of HMD 102 and/or a display of device 110), a visual representation 118 associated with content 105 being provided to first user 100 by HMD 102. In some embodiments, visual representation 118 may be associated with both content 105 and content 107. For example, the system generates for display visual representation 118 on external display 104 of HMD 102 that is visible to second user 108. The system may generate for display visual representation 118 associated with content 105 based on determining that second user 108 (e.g., a user in the vicinity of HMD 102) is an authorized user with respect first user 100. In some embodiments, visual representation 118 associated with the content comprises at least one of video of the content, one or more images of the content, a parental control rating of the content, a title of the content, or other metadata of the content, or any other suitable data indicative of the content, or any combination thereof. Visual representation 118 may additionally or alternatively comprise a source identifier, a movie poster, a progress point of a video, an episode number, a season number, any other suitable content data indicators, or any combination thereof. For example, in some embodiments, the system displays, via visual representation 118 on external display 104, the video currently being provided to first user 100 (e.g., a YouTube video), a parental control rating 117 (e.g., Rating=Mature), an external display option 119 to stop the current video (e.g., Stop video?), a source identifier 121 (e.g., a YouTube logo), and/or an external display option 123 to change the displayed content to different content (e.g., Change video?). In some embodiments, the system provides an option to enable the content to be modified based on input from second user 108. For example, the system displays, as part of visual representation 118, an option to stop the current video. The system may provide an option to modify the content by stopping display of the visual portion of the content, stopping audio of the content, replacing the content with different content, replacing a portion of the display of the content, replacing a portion of the audio of the content, powering off HMD 102, switching to a different application or website, any other suitable modification, or any combination thereof.

At step 120, in some embodiments, the system receives from second user 108 input to modify the content being provided via HMD 102 to first user 100. For example, the system may receive, via external display 104 of HMD 102, an external user interface selection (e.g., a touchscreen selection) or any other suitable input (e.g., voice input received via HMD 102 and/or device 110, keyboard input, biometric input, other input via device 110) of the option to stop the video. In some implementations, the system receives input from second user 108 via an external display of the HMD (e.g., external display 104 of HMD 102), such as, for example, a voice command, a gesture, a user interface input on a device of second user 108 (as described below in connection with FIG. 1B), any other suitable mode of input, or any combination thereof. Based at least in part on receiving input from second user 108 to modify the content, the system may instruct HMD 102 to cease providing the content to first user 100 or otherwise modify the content (e.g., switch to a different version of the content, or other content, with a more suitable parental control rating or switch to a different application providing a similar type of content with a more suitable parental control rating). In some implementations, the system generates for display, at external display 122, a notification 123 that the content has stopped. In some embodiments, the system may replace display of the content in viewport 106 with a notification for first user 100 in viewport 124 or pause display of the content and/or provide a notification 125 as an overlay on the content. In some embodiments, notification 125 informs first user 100 why content stopped and/or which authorized user stopped the content. For example, in viewport 124, the system generates for display notification 125 stating, "YouTube video stopped by Dad due to a mature rating."

In some embodiments, the system may determine an attentional focus level of first user 100. Attentional focus may refer to the degree to which first user 100 is focused on the content provided by HMD 102. In some embodiments, attentional focus may take into account whether content and/or an application being provided via the HMD generally requires (or is currently receiving) a user's sustained focus, a user's divided focus, a user's selective focus, and/or a user's alternating focus. In some implementations, the system may determine the attentional focus level of first user by obtaining, via a sensor of HMD 102, sensor data of first user 100. Attentional focus may be measured using a variety of sensors. For example, if first user 100 is active in a "lean-forward" experience in HMD 102, head and eye movement data may indicate the vigor with which first user 100 is focused in the experience. In some embodiments, one or more sensors of HMD 102 may be an electroencephalogram (EEG) sensor configured to measure brain waves of first user 100, as described further in connection with FIG. 3. The system may use other physiological data, such as, for example, heart rate and hand movement, to ascertain an immersion level to infer the attentional focus level of first user 100. The system may then determine, based on the sensor data, the attentional focus level of first user 100.

In some embodiments, the system may determine (e.g., by inferring or predicting) the attentional focus level of first user 100 by identifying a category of the content being provided via HMD 102 to first user 100. The category of the content may be determined by the application or preset by first user 100 or second user 108. For example, the system may determine that content from YouTube is "entertainment" content, while content from the Zoom app is "school" content (e.g., based on metadata for the content or application, or based on performing an audio and/or visual analysis of the displayed content or application). The system may then infer the attentional focus level of first user 100 based at least in part on the identified category of the content. For example, the system may infer that, since first user 100 is currently in a Zoom meeting (e.g., for an interview), first user 100 requires a high attentional focus level. In another example, the system may determine that first user 100 is currently listening to a podcast via YouTube and therefore requires a low attentional focus level, since more attentional focus is required to participate in a Zoom interview than to listen to a podcast. In some implementations, the system may determine an attentional focus level based on determined cognitive load or determined response time associated with the identified category of the content being provided via HMD 102 to first user 100. For example, based on historical user data, the system may determine that first user 100 on average takes longer to respond to stimulus within a Zoom meeting (when the user is participating in the Zoom meeting) than a stimulus within a video game (when the user is playing a video game). Based on the longer response time, the system may determine that first user 100 has a higher attentional focus level while playing the video game than while participating a Zoom meeting. In some embodiments, in addition or in the alternative to measuring a user's response to a stimulus with XR content or an XR app, the system may take into account a user's response to a stimulus (e.g., a parent tapping the child on the shoulder or speaking to the child) external to the XR content or XR app, while the user is using the XR content or XR app on the HMD.

In some implementations, visual representation 118 associated with the content may comprise an indication of the attentional focus level of first user 100 to indicate whether first user 100 is available to interact with second user 108. For example, the system may generate for display a visual representation comprising a symbol indicative of the attentional focus level of first user 100, such as a green circle, a yellow circle, or a red circle. The system may generate for display a first type of visual representation when first user 100 is available to interact with second user 108. For example, the system may generate for display a visual representation and tint external display 104 of HMD 102 a green hue to indicate that first user 100 is available to interact with second user 108 due to a low attentional focus level. In another example, while HMD 102 is in reverse passthrough, the system may modify (e.g., adding to or altering) the colors of the irises of first user 100 to a color representing a low attentional focus level. The system may determine the iris positions of first user 100 using eye tracking in real time and create a composite image on external display 104 with the focus indicator overlaid on the iris of the reverse passthrough image. The system may generate for display a second type of visual representation, different from the first type of visual representation, when first user 100 is unavailable to interact with second user 108. For example, the system may generate for display a visual representation and tint external display 104 of HMD 102 a red hue to indicate that first user 100 is not available to interact with second user 108 due to the user currently accessing an application or content that likely requires the first user 100 to have a high attentional focus level. In another example, while HMD 102 is in reverse passthrough, the system may modify the colors of the irises of first user 100 to a color representing a high attentional focus level. Such visual cue may let neighboring persons know that the user is unable to engage as their mental resources are directed elsewhere.

In some embodiments, when HMD 102 is associated with audio speakers or headphones (e.g., wired or wirelessly coupled to HMD 102), the system may employ noise cancellation based on the determined attentional focus level. When the system determines that first user 100 has an attentional focus level above an attentional focus threshold, the system may activate noise cancellation so that external audio stimuli is minimized. In some implementations, the system determines that second user 108 is requesting to interact with first user 100. For example, the system may determine, by analyzing an image captured via image capture at HMD 102 and/or device 110, that second user 108 performed a gesture indicating a request for attention from first user 100, such as hand-waving proximate to first user 100. Such aspects allow the system to alert first user 100, to avoid second user 108 startling first user 100 immersed in VR or otherwise engaged in AR or any other suitable XR. The system may, based on determining that the attentional focus of first user 100 is above an attentional focus level threshold, queue, for later notification to first user 100, an indication of the request from second user 108. For example, upon determining that first user 100 has an attentional focus level above an attentional focus threshold, based on EEG data, the system may queue the request for attention from second user 108 until the system determines that the attentional focus level of first user 100 reduces to a value that is below the attentional focus threshold value. In some embodiments, the system may, based on determining, at a later time, that the attentional focus level of first user 100 is below the attentional focus threshold, provide the queued indication to first user 100. The system may provide an indication of the request via an image, recording of the second user performing a gesture, a visual or textual representation of the gesture (e.g., call me, or "bye" to indicate to the first user that the second user has left, etc.), a text message or by displaying text in the form of a notification, pausing the content being provided, any other suitable indication, or any combination thereof. For example, based on determining, via EEG data, that the attentional focus level of first user 100 has reduced to below the attentional focus threshold, the system may provide an image of second user 108 within viewport 106 of HMD 102. In some embodiments, the system may interpret the gesture performed by second user 108. For example, the system may interpret the gesture using any suitable computer-implemented technique, e.g., using trained machine learning models and/or training a machine learning model to recognize the gestures such as "bye," "call me," "love you," "see you soon," or any other suitable gesture, or any combination thereof.

Figure 1B:
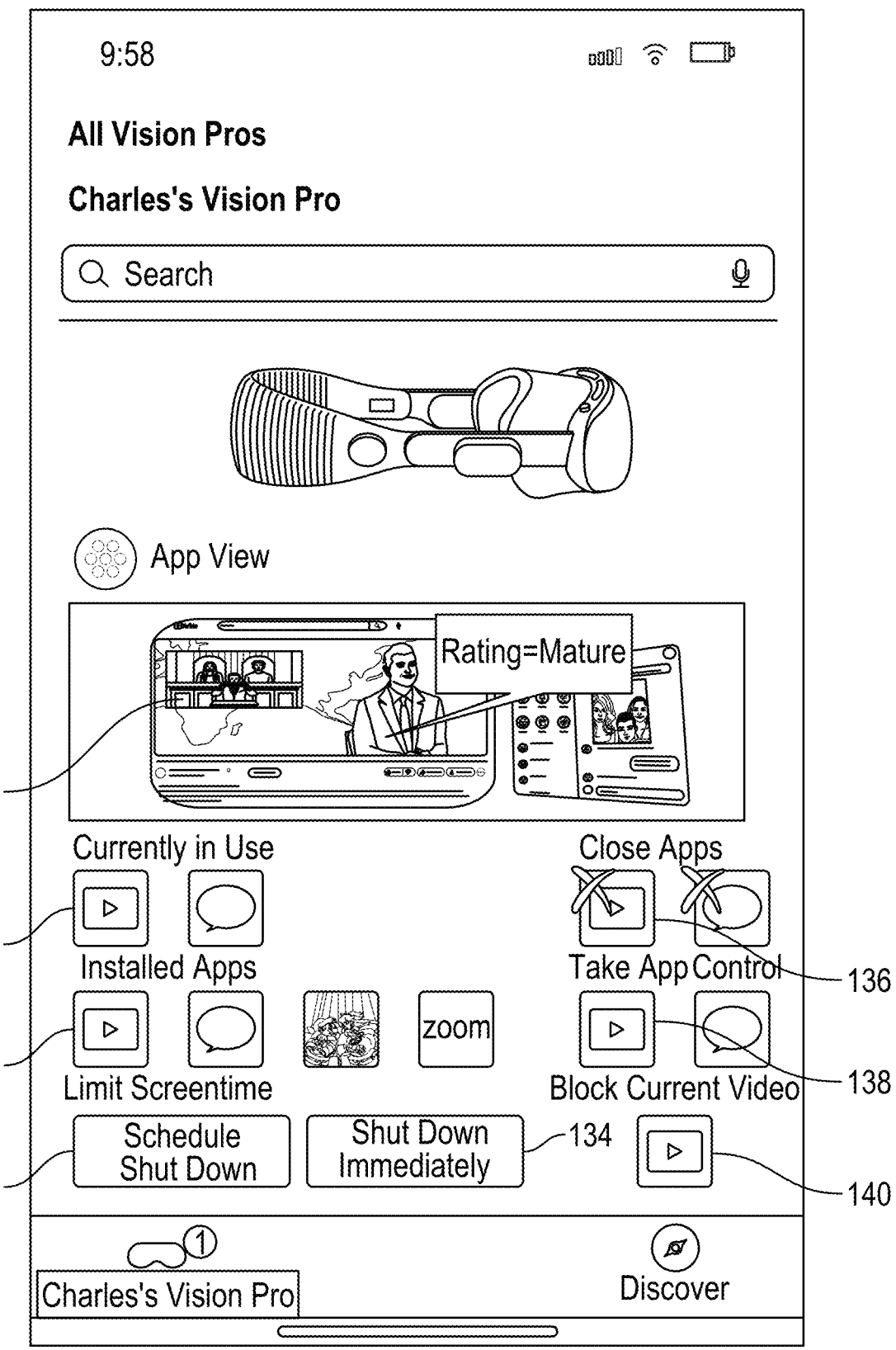
FIG. 1B shows an illustrative example of providing parental controls for HMD content, in accordance with some embodiments of this disclosure.

FIG. 1B shows an illustrative example of a user interface (e.g., user interface 125) of a device of an authorized second user (e.g., second user 108 described above in connection with FIG. 1A) for modifying content provided to a first user (e.g., first user 100 described above in connection with FIG. 1A) via an HMD (e.g., HMD 102 described above in connection with FIG. 1A), in accordance with some embodiments of this disclosure. As shown in FIGS. 1A-1B, the option to modify the content being provided at HMD 102 may be provided via external display 104 of HMD 102 and/or via device 110 of user 108. In some embodiments, device 110 of second user 108 may be a user equipment device, such as a laptop, smartphone, tablet, television, XR device, HMD, any other suitable device or any combination thereof. For example, second user 108 is associated with a smartphone. The system may generate for display user interface 125 via a parental control application or other suitable application permitting interaction with or monitoring of content or applications being accessed via HMD 102. Second user 108 may be an authorized user with respect to more than one user. For example, a father (e.g., second user 108) is an authorized user with respect to his son Charles (e.g., first user 100) and his daughter Jane (e.g., another HMD user). In some implementations, user interface 125 is specific to the activity of one user. For example, user interface 125 displays activity associated with Charles's Vision Pro (e.g., HMD 102 is signed in to a user profile of first user 100). In some implementations, user interface 125 may display activity of more than one user profile. For example, the system may display activity associated with Charles's Vision Pro and Jane's Vision Pro simultaneously on user interface 125.

In some embodiments, the system generates for display, at user interface 125 of a device of the second user (e.g., device 110 of second user 108), visual representation 126 associated with the content provided to first user 100 via HMD 102. For example, the system displays, at user interface 125, an app view (e.g., visual representation 126) of the current viewport of HMD 102. Visual representation 126 comprises, for example, an image of the content and an overlay of a parental control rating of the content (e.g., Rating=Mature). In some embodiments, the system generates for display, at user interface 125, the applications that are currently open on HMD 102 (e.g., Currently in Use apps 128) and the applications that are installed on HMD 102 (e.g., Installed Apps 130). The input from second user 108 to modify the content being provided via HMD 102 may be received via user interface 125 of device 110 of second user 108. For example, the system may receive a user interface selection instructing the system to close the YouTube app on HMD 102 (e.g., a user interface selection of the YouTube app logo under the Close Apps 136 heading). In another example, the system may receive a user interface selection instructing the system to give control of the YouTube app on HMD 102 to second user 108 (e.g., a user interface of the YouTube app logo under the Take App Control 138 heading). In another example, the system may receive a user interface selection instructing the system to block the video currently being provided to first user 100 via HMD 102 by YouTube (e.g., a user interface selection of the YouTube app logo under the Block Current Video 140 heading). In some embodiments, apps under Block Current Video 140 heading are apps that comprise a video component.

In some implementations, the input from second user 108 to modify the content being provided via HMD 102 is a voice command from second user 108 received via device 110 of second user 108. For example, the system may receive, via device 110, a voice command from second user 108 instructing the system to cease providing the content to first user 100 via HMD 102. The system may receive input, via user interface 125 or via voice command, to limit the screentime of first user 100 at HMD 102. For example, the system may receive a user interface selection from second user 108 of the Schedule Shutdown option 132 which may instruct the system to power off HMD 102 in a particular amount of time (e.g., 30 minutes). The particular amount of time may be selected by second user 108, preset by the system, or predetermined by the system based on user history of second user 108 and first user 100. In another example, the system may receive a voice command, from second user 108 via device 110, instructing the system to power off HMD 102 immediately (e.g., a voice input selecting the Shut Down Immediately 134 option).

Figure 2:
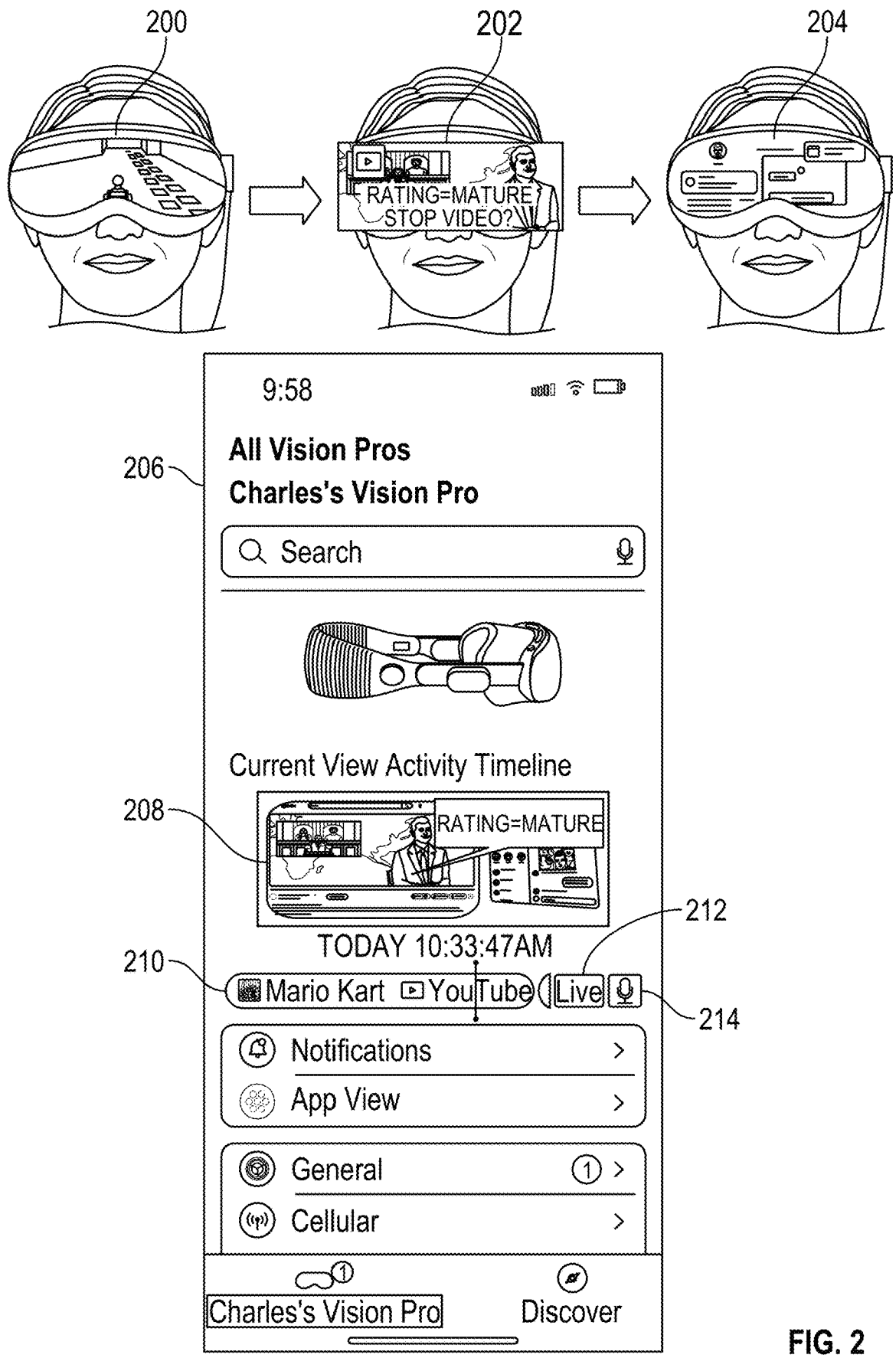
FIG. 2 shows an illustrative example of providing an HMD event timeline and generating for display HMD events at a user interface and/or an external display of an HMD, in accordance with some embodiments of this disclosure.

FIG. 2 shows an illustrative example of providing an HMD event timeline and generating for display HMD events at a user interface and/or an external display of an HMD, in accordance with some embodiments of this disclosure. In some embodiments, a system (e.g., the system as described in connection with FIGS. 1A-1B) records, during a period of time comprising a plurality of timepoints, a plurality of events occurring within a viewport (e.g., viewport 106 as described in connection with FIG. 1A) of an HMD (e.g., HMD 102 as described in connection with FIG. 1A) while the first user (e.g., first user 100 as described in connection with FIGS. 1A-1B) is wearing HMD 102. For example, during a 12-hour period (e.g., or any other period of time of any other suitable length), the system may record first user 100 playing a video game (e.g., event 200), watching a YouTube video (e.g., event 202), and texting a friend (e.g., event 204). The system may generate for display a visual representation of events 200, 202, and 204 at an external display (e.g., external display 104 as described in connection with FIG. 1A) of HMD 102 (and/or at device 110 of FIGS. 1A-1B of user 108) if the system detects that an authorized second user (e.g., second user 108 as described in connection with FIGS. 1A-1B) is in a vicinity of first user 100. First user 100 may have played the video game at 9:23 p.m. yesterday, watched the YouTube video at 10:14 a.m. today, and texted a friend at 10:29 a.m. today (e.g., respectively corresponding to a plurality of timepoints). The plurality of events may relate to content provided via one or more applications to first user 100. For example, the plurality of events may comprise data from apps (e.g., Mario Kart, YouTube, and Messages) accessed by first user 100 during a 12-hour period.

In some implementations, the system generates for display, at a user interface 206 of the device of the second user (e.g., device 110 as described in connection with FIG. 1A), a timeline of the plurality of events. The system may also generate for display the content currently being provided via viewport 106 at user interface 206 (e.g., Current View 208). For example, below Current View 208, the system generates for display timeline 210. Timeline 210 may comprise visual indicators of the content provided to first user 100 in a period of time (e.g., the app logo and/or the name of the app). In some embodiments, based on receiving selection of a particular timepoint of the plurality of timepoints of the timeline, the system generates for display, at user interface 206 of the device of second user 108, data of a particular event of the plurality of events that occurred within the viewport at the particular timepoint. For example, based on receiving a selection of the portion of user interface 206 displaying the YouTube logo within timeline 210, the system may generate for display data of the actions of first user 100 at the time first user 100 was using YouTube (e.g., an image of the video watched, a parental content rating of the video watched, a playback of the video, any other suitable data, or any combination thereof). The system may generate for display the data of the particular event in place of Current View 208.

In some embodiments, the system generates for display, on an external display 104 of HMD 102 (e.g., as described in connection with FIGS. 1A-1B) a visual representation of the content provided by HMD 102. For example, the system generates for display visual representations of event 200 at a first time (e.g., a screenshot of a YouTube video watched by first user 100 earlier in the day). In some embodiments, the system determines whether a timer has expired. For example, a timer may represent a time interval after which the visual representation of the content is refreshed on external display 104. A short time interval may allow second user 108 to receive a more granular understanding of the content being provided to first user 100. Based on determining that the timer has expired, the system may generate for display, at the user interface of the device of the second user, data of another event of the plurality of events that occurred within the viewport at a different timepoint, instead of the data of the particular event that occurred at the particular timepoint. For example, after 30 seconds, the system may generate for display, at user interface 206, data of event 202 such as video playback of the YouTube video and an indicator of the maturity rating of event 202 (e.g., Rating=Mature). In some embodiments, the system generates for display data of another event of the plurality of events at external display 104 based on the timer expiring. For example, each time the timer expires, the system may generate for display data of subsequent events, e.g., events 200, 202, and 204, at external display 104 as a "slideshow." In some implementations, the system may generate for display a video summary of multiple events (e.g.,, 200, 202, and 204, and/or any other suitable combination of events), at external display 104. The system may then restart the timer after the system generates for display data of another event.

In some implementations, the system provides to second user 108 user interface options 212 and 214. For example, based on receiving a user interface input selecting user interface option 212 (e.g., "Live"), the system may generate for display a live feed of the content being provided to first user 100 via the viewport of HMD 102. Based on receiving a user interface input selecting user interface option 214 (e.g., the microphone icon), the system may provide second user 108 the ability to speak to first user 100 through speakers of HMD 102.

Figure 3A:
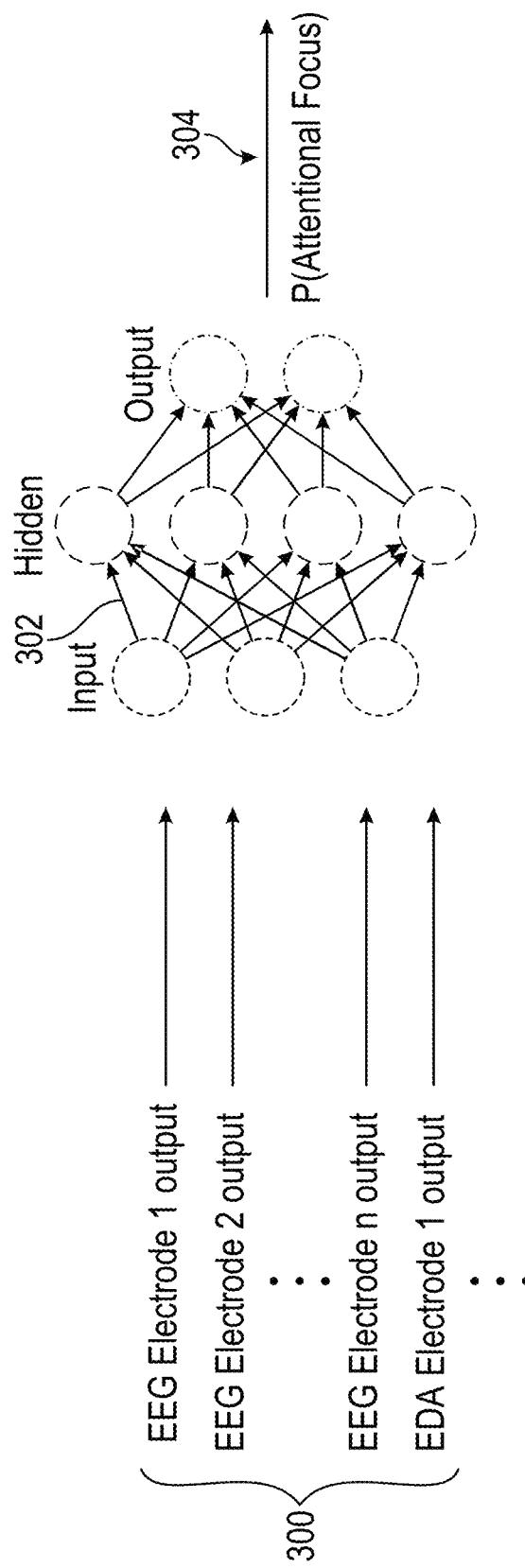
FIG. 3A shows an illustrative example of a neural network for generating a probability that an HMD user is in attentional focus, in accordance with some embodiments of this disclosure.

FIG. 3A shows an illustrative example of a neural network for generating a probability that an HMD user is in attentional focus, in accordance with some embodiments of this disclosure. In some embodiments, a system (e.g., the system as described in connection with FIGS. 1A-1B) provides content to an HMD user (e.g., first user 100 as described in connection with FIGS. 1A-1B) via data received from an HMD (e.g., HMD 102 as described in connection with FIGS. 1A-1B). In some embodiments, the system determines the attentional focus level of first user 100 via electroencephalogram (EEG) sensors. When the determined attentional focus level of first user 100 is above an attentional focus level threshold, first user 100 may be said to be "in attentional focus." The system may determine the attentional focus level of an HMD user using data from a plurality of sensors, e.g., EEG sensors, electrodermal activity (EDA) sensors, electromyogram (EMG) sensors, photoplethysmogram (PPG) sensors, electrooculogram (EOG) sensors, eye tracking sensors, any other suitable sensor, or any combination thereof. HMD 102 may comprise one or more sensors of the plurality of sensors.

In some embodiments, sensor outputs, e.g., EEG and EDA electrode outputs 300 are used as inputs in neural network 302. While the precise algorithm for determining an attentional focus level may be determined empirically, determining the attentional focus level may include use of machine learning such as SVM, MLP, CNN, any other suitable machine learning algorithm, or any combination thereof. The attentional focus level may be based on thresholding of multiple inputs. Neural network 302 may generate a probability P(Attentional Focus) 304. In some implementations, P(Attentional Focus) 304 is a probability that first user 100 is in attentional focus (e.g., an attentional focus level above an attentional focus threshold). Neural network 302 may be trained using machine learning such as SVM, MLP, CNN, any other suitable machine learning algorithm, or any combination thereof. If the value of P(Attentional Focus) exceeds an attentional focus threshold, the system may display a visual or audio cue to an external user that the user is unavailable at external display 104 of HMD 102. For example, when P(Attentional Focus) is below a first attentional focus threshold, the system may display a green hue with reverse passthrough to indicate that first user 100 is available. Passthrough may refer to a feature of HMD 102 that allows first user 100 to see the external environment around HMD 102. Reverse passthrough may refer to a feature of HMD 102 that allows an external user to see the eyes of first user 100. Between the first and a second attentional focus threshold, the system may display a yellow hue to indicate that first user 100 may or may not be available. If P(Attentional Focus) is above the second attentional focus threshold, the system may display a red hue indicating that first user 100 is unavailable.

Figure 3B:
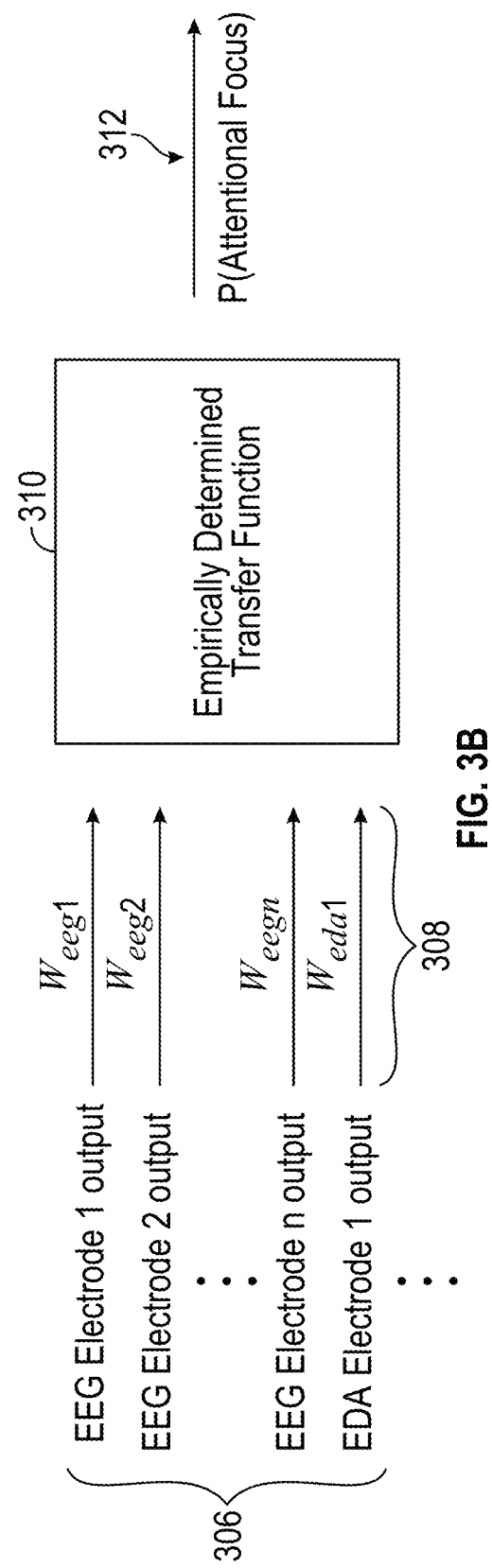
FIG. 3B shows an illustrative example of an algorithmic approach for generating a probability that the HMD user is in attentional focus by weighing different sensor inputs and applying the different sensor inputs to an empirically derived transfer function, in accordance with some embodiments of this disclosure.

FIG. 3B shows an illustrative example of an algorithmic approach for generating a probability that the HMD user is in attentional focus by weighing different sensor inputs and applying the different sensor inputs to an empirically derived transfer function, in accordance with some embodiments of this disclosure. In some embodiments, a system (e.g., the system as described in connection with FIGS. 1A-1B) provides content to an HMD user (e.g., first user 100 as described in connection with FIGS. 1A-1B) based on data received from an HMD (e.g., HMD 102 as described in connection with FIGS. 1A-1B). In some embodiments, the system determines the attentional focus level of first user 100 via electroencephalogram (EEG) sensors. When the determined attentional focus level of first user 100 is above an attentional focus level threshold, first user 100 may be said to be "in attentional focus." The system may determine the attentional focus level of an HMD user using data from a plurality of sensors, e.g., EEG sensors, electrodermal activity (EDA) sensors, electromyogram (EMG) sensors, photoplethysmogram (PPG) sensors, electrooculogram (EOG) sensors, eye tracking sensors, any other suitable sensor, or any combination thereof. HMD 102 may comprise one or more sensors of such plurality of sensors.

In some embodiments, the system determines weights $W_{eeg/eda}$ 308 of EEG and EDA electrode outputs 306 and applies weights $W_{eeg/eda}$ 308 to a transfer function (e.g., empirically derived transfer function 310). EEG and EDA electrode outputs 306 may be the same as EEG and EDA Electrode outputs 300. The system may use empirically derived transfer function 310 to generate a probability of first user 100 being in attentional focus, e.g., P(Attentional Focus) 312. If the value of P(Attentional Focus) exceeds an attentional focus threshold, the system may display a visual or audio cue to an external user that the user is unavailable at an external display of HMD 102 (e.g., external display 104 as described in connection with FIG. 1A). For example, when P(Attentional Focus) is below a first attentional focus threshold, the system may display a green hue with reverse passthrough to indicate that first user 100 is available. Passthrough may refer to a feature of HMD 102 that allows first user 100 to see the external environment around HMD 102. Reverse passthrough may refer to a feature of HMD 102 that allows an external user to see the eyes of first user 100. Between the first and a second attentional focus threshold, the system may display a yellow hue to indicate that first user 100 may or may not be available. If P(Attentional Focus) is above the second attentional focus threshold, the system may display a red hue indicating that first user 100 is unavailable.

Figure 4:
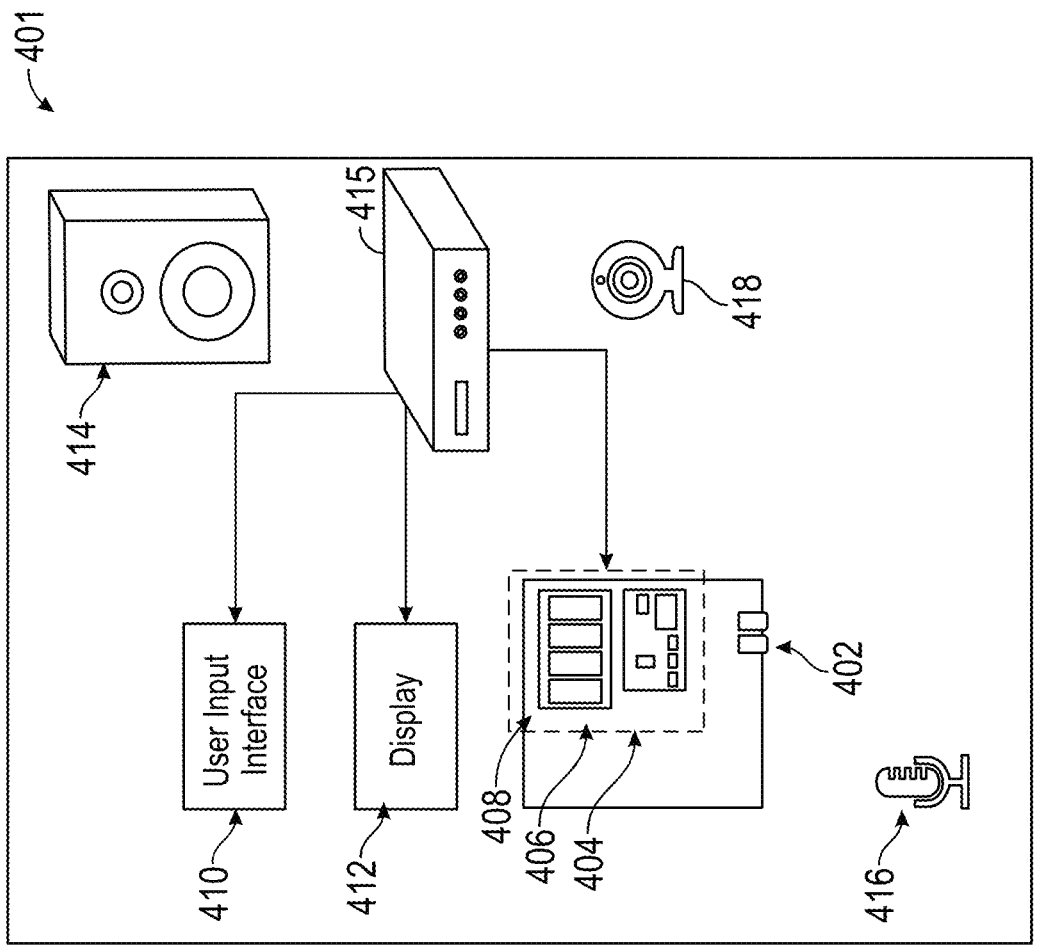
FIG. 4 shows an illustrative user equipment device, in accordance with some embodiments of this disclosure.
Figure 4:
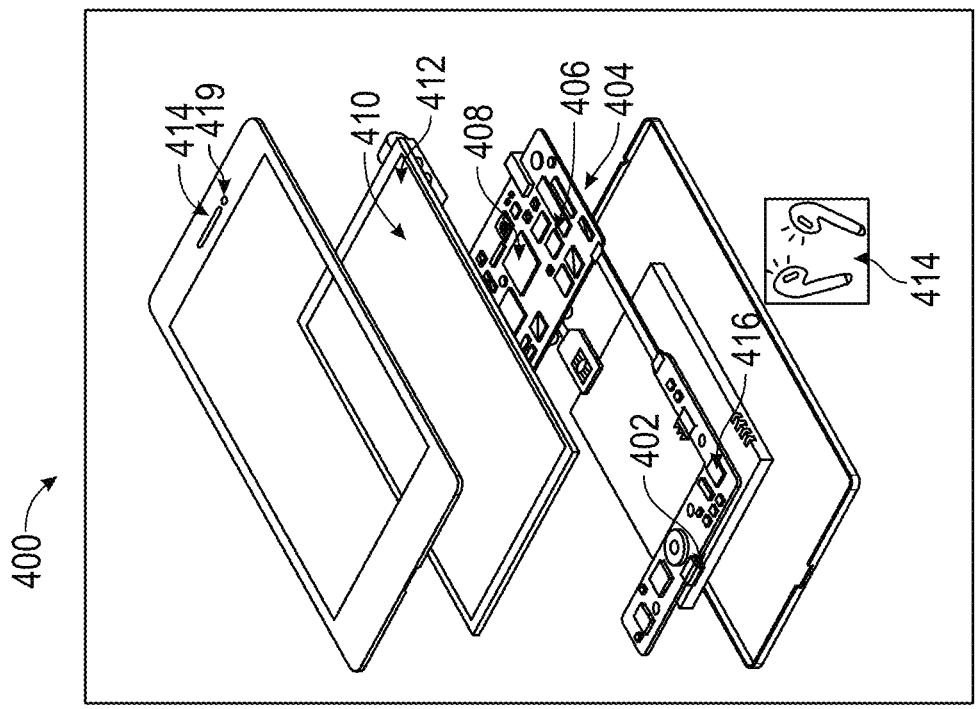
Figure 5:
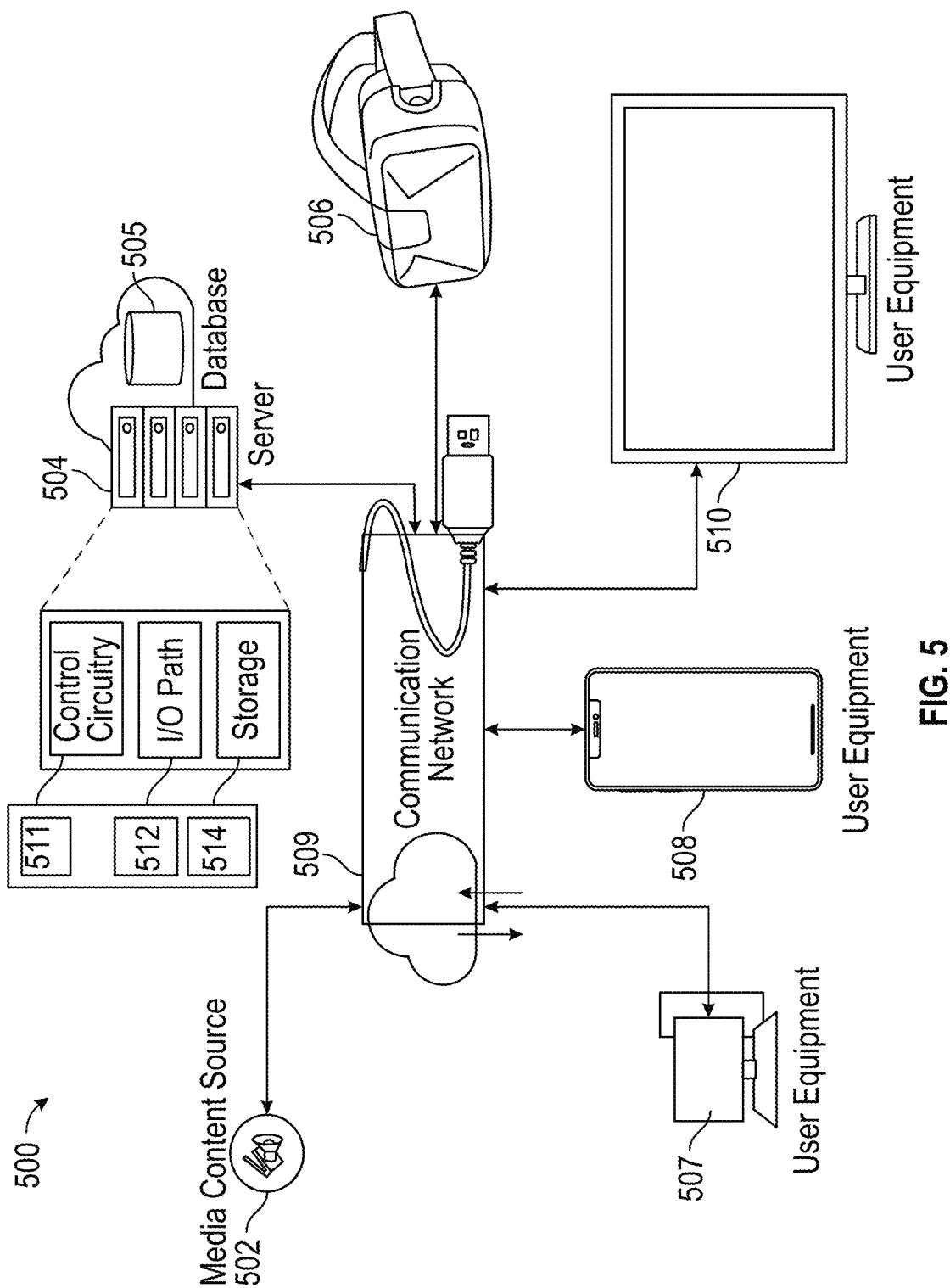
FIG. 5 shows an illustrative user equipment device, in accordance with some
embodiments of this disclosure.

FIGS. 4-5 describe illustrative devices, systems, servers, and related hardware for providing parental controls for HMD content, in accordance with some embodiments of the present disclosure. FIG. 4 shows generalized embodiments of illustrative user equipment 400 and 401, which may correspond to, e.g., HMD 102 of FIG. 1A. For example, user equipment 400 may be a smartphone device, a tablet, a near-eye display device, an XR device, or any other suitable device capable of participating in a XR environment, e.g., locally or over a communication network. In another example, user equipment 401 may be a user television equipment system or device. User equipment 401 may include set-top box 415. Set-top box 415 may be communicatively connected to microphone 416, audio output equipment 414 (e.g., speaker or headphones), and display 412. In some embodiments, microphone 416 may receive audio corresponding to a voice of a user and/or ambient audio data. In some embodiments, display 412 may be a television display or a computer display. In some embodiments, set-top box 415 may be communicatively connected to user input interface 410. In some embodiments, user input interface 410 may be a remote-control device. Set-top box 415 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment are discussed below in connection with FIG. 5. In some embodiments, user equipment 400 may comprise any suitable number of sensors (e.g., gyroscope or gyrometer, or accelerometer, etc.), and/or a GPS module (e.g., in communication with one or more servers and/or cell towers and/or satellites) to ascertain a location of user equipment 400. In some embodiments, user equipment 400 comprises a rechargeable battery that is configured to provide power to the components of the device.

Each one of user equipment 400 and user equipment 401 may receive content and data via input/output (I/O) path 402. I/O path 402 may provide content (e.g., broadcast programming, on-demand programming, internet content, content available over a local area network (LAN) or wide area network (WAN), and/or other content) and data to control circuitry 404, which may comprise processing circuitry 406 and storage 408. Control circuitry 404 may be used to send and receive commands, requests, and other suitable data using I/O path 402, which may comprise I/O circuitry. I/O path 402 may connect control circuitry 404 to one or more communications paths (described below). I/O functions may be provided by one or more of these communications paths but are shown as a single path in FIG. 4 to avoid overcomplicating the drawing. While set-top box 415 is shown in FIG. 4 for illustration, any suitable computing device having processing circuitry, control circuitry, and storage may be used in accordance with the present disclosure. For example, set-top box 415 may be replaced by, or complemented by, a personal computer (e.g., a notebook, a laptop, a desktop), a smartphone (e.g., user equipment 400), an XR device, a tablet, a network-based server hosting a user-accessible client device, a non-user-owned device, any other suitable device, or any combination thereof.

Control circuitry 404 may be based on any suitable control circuitry such as processing circuitry 406. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 404 executes instructions for the system (as described in connection with FIGS. 1-3) stored in memory (e.g., storage 408). Specifically, control circuitry 404 may be instructed by the system to perform the functions discussed above and below. In some implementations, processing or actions performed by control circuitry 404 may be based on instructions received from the system.

In client/server-based embodiments, control circuitry 404 may include communications circuitry suitable for communicating with a server or other networks or servers. The system may be a stand-alone application implemented on a device or a server. The application may be implemented as software or a set of executable instructions. The instructions for performing any of the embodiments discussed herein of the application may be encoded on non-transitory computer-readable media (e.g., a hard drive, random-access memory on a DRAM integrated circuit, read-only memory on a BLU-RAY disk, etc.). For example, in FIG. 4, the instructions may be stored in storage 408, and executed by control circuitry 404 of a user equipment 400.

In some embodiments, the application may be a client/server application where only the client application resides on user equipment 400, and a server application resides on an external server (e.g., server 504 and/or media content source 502). For example, the application may be implemented partially as a client application on control circuitry 404 of user equipment 400 and partially on server 504 as a server application running on control circuitry 511. Server 504 may be a part of a local area network with one or more of user equipment 400, 401 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 504 and/or an edge computing device), referred to as "the cloud." User equipment 400 may be a cloud client that relies on the cloud computing capabilities from server 504 to generate personalized engagement options in a VR environment.

Control circuitry 404 may include communications circuitry suitable for communicating with a server, edge computing systems and devices, a table or database server, or other networks or servers. The instructions for carrying out the above-mentioned functionality may be stored on a server (which is described in more detail in connection with FIG. 5). Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the internet or any other suitable communication networks or paths (which is described in more detail in connection with FIG. 5). In addition, communications circuitry may include circuitry that enables peer-to-peer communication of user equipment, or communication of user equipment in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Storage 408 may be used to store various types of content described herein as well as application data described above. Nonvolatile memory may also be used (e.g., to launch a boot-up routine and other instructions). Cloud-based storage, described in relation to FIG. 4, may be used to supplement storage 408 or instead of storage 408. Non-transitory memory may store instructions that, when executed by control circuitry, I/O circuitry, any other suitable circuitry or combination thereof, executes functions of an application as described above.

Control circuitry 404 may include video generating circuitry and tuning circuitry, such as one or more analog tuners, one or more MPEG-2 decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 404 may also include scaler circuitry for upconverting and downconverting content into the preferred output format of user equipment 400. Control circuitry 404 may also include digital-to-analog converter circuitry and analog-to-digital converter circuitry for converting between digital and analog signals. The tuning and encoding circuitry may be used by user equipment 400, 401 to receive and to display, to play, or to record content. The tuning and encoding circuitry may also be used to receive video communication session data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

Control circuitry 404 may receive instruction from a user by way of user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of each one of user equipment 400 and user equipment 401. For example, display 412 may be a touchscreen or touch-sensitive display. In such circumstances, user input interface 410 may be integrated with or combined with display 412. In some embodiments, user input interface 410 includes a remote-control device having one or more microphones, buttons, keypads, any other components configured to receive user input or combinations thereof. For example, user input interface 410 may include a handheld remote-control device having an alphanumeric keypad and option buttons. In a further example, user input interface 410 may include a handheld remote-control device having a microphone and control circuitry configured to receive and identify voice commands and transmit information to set-top box 415.

Audio output equipment 414 may be integrated with or combined with display 412. Display 412 may be one or more of a monitor, television, liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 412. Audio output equipment 414 may be provided as integrated with other elements of each one of user equipment 400 and user equipment 401 or may be stand-alone units. An audio component of videos and other content displayed on display 412 may be played through speakers (or headphones) of audio output equipment 414. In some embodiments, audio may be distributed to a receiver (not shown), which processes and outputs the audio via speakers of audio output equipment 414. In some embodiments, for example, control circuitry 404 is configured to provide audio cues to a user, or other audio feedback to a user, using speakers of audio output equipment 414. There may be a separate microphone 416 or audio output equipment 414 may include a microphone configured to receive audio input such as voice commands or speech. For example, a user may speak letters or words that are received by the microphone and converted to text by control circuitry 404. In a further example, a user may voice commands that are received by a microphone and recognized by control circuitry 404. Camera 418 may be any suitable video camera integrated with the equipment or externally connected. Camera 418 may be a digital camera comprising a charge-coupled device (CCD) and/or a complementary metal-oxide semiconductor (CMOS) image sensor. Camera 418 may be an analog camera that converts to digital images via a video card.

The application may be implemented using any suitable architecture. For example, it may be a stand-alone application wholly implemented on each one of user equipment 400 and user equipment 401. In such an approach, instructions of the application may be stored locally (e.g., in storage 408), and data for use by the application is downloaded on a periodic basis (e.g., from an out-of-band feed, from an internet resource, or using another suitable approach). Control circuitry 404 may retrieve instructions of the application from storage 408 and process the instructions to provide video conferencing functionality and generate any of the displays discussed herein. Based on the processed instructions, control circuitry 404 may determine what action to perform when input is received from user input interface 410. For example, movement of a cursor on a display up/down may be indicated by the processed instructions when user input interface 410 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, random access memory (RAM), etc.

Control circuitry 404 may allow a user to provide user profile information or may automatically compile user profile information. For example, control circuitry 404 may access and monitor network data, video data, audio data, processing data, content consumption data, and/or any other suitable data being accessed by a first user (e.g., first user 100 of HMD 102). Control circuitry 404 may obtain all or part of other user profiles that are related to a particular user (e.g., via social media networks), and/or obtain information about the user from other sources that control circuitry 404 may access. As a result, a user can be provided with a unified experience across the user's different devices.

In some embodiments, the application is a client/server-based application. Data for use by a thick or thin client implemented on each one of user equipment 400 and user equipment 401 may be retrieved on demand by issuing requests to a server remote to each one of user equipment 400 and user equipment 401. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on user equipment 400. This way, the processing of the instructions is performed remotely by the server while the resulting displays (e.g., that may include text, a keyboard, or other visuals) are provided locally on user equipment 400. User equipment 400 may receive inputs from the user via user input interface 410 and transmit those inputs to the remote server for processing and generating the corresponding displays. For example, user equipment 400 may transmit a communication to the remote server indicating that an up/down button was selected via user input interface 410. The remote server may process instructions in accordance with that input and generate a display of the application corresponding to the input (e.g., a display that moves a cursor up/down). The generated display is then transmitted to user equipment 400 for presentation to the user.

In some embodiments, the application may be downloaded and interpreted or otherwise run by an interpreter or virtual machine (run by control circuitry 404). In some embodiments, the application may be encoded in the ETV Binary Interchange Format (EBIF), received by control circuitry 404 as part of a suitable feed, and interpreted by a user agent running on control circuitry 404. For example, the application may be an EBIF application. In some embodiments, the application may be defined by a series of JAVA-based files that are received and run by a local virtual machine or other suitable middleware executed by control circuitry 404. In some of such embodiments (e.g., those employing MPEG-2, MPEG-4, HEVC or any other suitable digital media encoding schemes), the application may be, for example, encoded and transmitted in an MPEG-2 object carousel with the MPEG audio and video packets of a program.

As shown in FIG. 5, user equipment 506, 507, 508, 510 (which may correspond to user equipment, e.g., HMD 102 of FIG. 1A) may be coupled to communication network 509. Communication network 509 may be one or more networks including the internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 509) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 5 to avoid overcomplicating the drawing.

Although communications paths are not drawn between user equipment, these devices may communicate directly with each other via communications paths as well as other short-range, point-to-point communications paths, such as USB cables, IEEE 1394 cables, wireless paths (e.g., Bluetooth, infrared, IEEE 702-11x etc.), or other short-range communication via wired or wireless paths. The user equipment may also communicate with each other directly through an indirect path via communication network 509.

System 500 may comprise media content source 502, one or more servers 504, and/or one or more edge computing devices. In some embodiments, the application may be executed at one or more of control circuitry 511 of server 504 (and/or control circuitry of user equipment 506, 507, 508, 510 and/or control circuitry of one or more edge computing devices). In some embodiments, the media content source and/or server 504 may be configured to host or otherwise facilitate video communication sessions between user equipment 506, 507, 508, 510 and/or any other suitable user equipment, and/or host or otherwise be in communication (e.g., over communication network 509) with one or more social network services.

In some embodiments, server 504 may include control circuitry 511 and storage 514 (e.g., RAM, ROM, Hard Disk, Removable Disk, etc.). Storage 514 may store one or more databases. Server 504 may also include an I/O path 512. In some embodiments, I/O path 512 is an I/O circuitry. I/O circuitry may be a NIC card, audio output device, mouse, keyboard card, any other suitable I/O circuitry device or combination thereof. I/O path 512 may provide video conferencing data, device information, or other data, over a local area network (LAN) or wide area network (WAN), and/or other content and data to control circuitry 511, which may include processing circuitry, and storage 514. Control circuitry 511 may be used to send and receive commands, requests, and other suitable data using I/O path 512, which may comprise I/O circuitry. I/O path 512 may connect control circuitry 511 to one or more communications paths.

Control circuitry 511 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 511 may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 511 executes instructions for an emulation system application stored in memory (e.g., the storage 514). Memory may be an electronic storage device provided as storage 514 that is part of control circuitry 511. Memory may store instruction to run the application.

Figure 6:
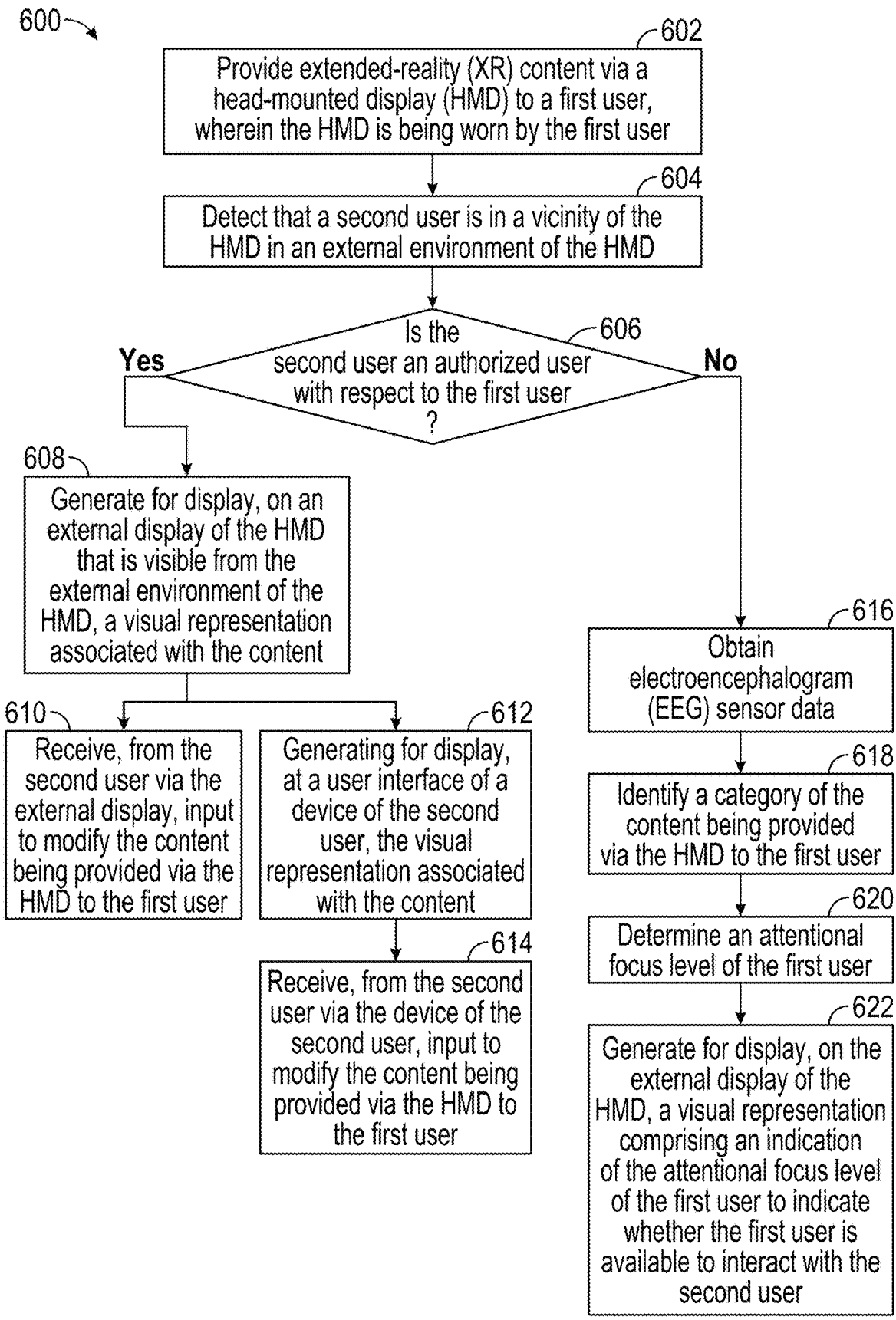
FIG. 6 is a flowchart of a detailed illustrative process 600 for generating for display a visual representation of HMD content provided to a first user, in accordance with some embodiments of this disclosure.

FIG. 6 is a flowchart of a detailed illustrative process 600 for generating for display a visual representation of HMD content provided to a first user, in accordance with some embodiments of this disclosure. In various embodiments, the individual steps of process 600 may be implemented by one or more components of the devices, methods, and systems of FIGS. 1A-5, and 7-12 and may be performed in combination with any of the other processes and aspects described herein. Although the present disclosure may describe certain steps of process 600 (and of other processes described herein) as being implemented by certain components of the devices, methods, and systems of FIGS. 1A-5, and 7-12, this is for purposes of illustration only. It should be understood that other suitable components of the devices, methods, and systems may implement those steps instead.

In some embodiments, at step 602, control circuitry (e.g., control circuitry 404 of user equipment device 400 and/or control circuitry 511 of server 504) provides extended reality (XR) content via a head-mounted display (HMD), wherein the HMD (HMD 102 as described in connection with FIGS. 1A-1B) is being worn by the first user (e.g., first user 100 as described in connection with FIGS. 1A-1B). For example, control circuitry 404 may provide first user 100 with YouTube video content via HMD 102. At step 604, in some implementations, control circuitry 404 detects that a second user (e.g., second user 108 as described in connection with FIGS. 1A-1B) is in a vicinity of the HMD in an external environment of the HMD. For example, control circuitry 404 may detect a device of second user 108 (e.g., device 110 as described in connection with FIGS. 1A-1B) within a threshold distance of HMD 102. Control circuitry 404, in some embodiments, determines whether the second user is an authorized user with respect to the first user. For example, control circuitry 404 may capture an image of the second user and use facial recognition techniques to determine whether the second user is authorized with respect to the first user. Additionally or alternatively, as described in connection with FIG. 1A, control circuitry 404 may receive a voice command from second user 108 and identify identity information of second user 108 based on the received voice command. As another example, the HMD and the device of the second user may wirelessly communicate (e.g., device 110 may broadcast a device identifier indicating the presence of device 110 and user 108), and the signal strength of such wireless communication may be indicative of the user being in the vicinity of the HMD. Control circuitry 404 may determine, based on the identity information, that second user 108 is an authorized user with respect to first user 100 (e.g., Yes, at 660). If control circuitry 404 determines that the second user is an authorized user with respect to the first user, control circuitry 404 may proceed to step 608 and generate for display, on an external display of the HMD (e.g., external display 104 of HMD 102 as described in connection with FIGS. 1A-1B) that is visible from the external environment of the HMD, a visual representation associated with the content. For example, control circuitry 404 may generate for display a visual representation (e.g., visual representation 118 on external display 104, comprising the video currently being provided to first user 100 (e.g., a YouTube video), a parental control rating (e.g., Ranking=Mature), an option to stop the current video, and a source identifier (e.g., a YouTube logo), as described in connection with FIG. 1A).

In some implementations, control circuitry 404 may proceed to step 610 and receive, from the second user via the external display, input to modify the content being provided via the HMD to the first user. For example, control circuitry 404 may receive a touchscreen input, at external display 104 from second user 108, instructing control circuitry 404 to skip a portion of the content that has a mature rating. In some embodiments, control circuitry 404 may proceed to step 612 and generate for display, at a user interface of a device of the second user (e.g., device 110 as described in connection with FIGS. 1A-1B), the visual representation associated with the content. For example, control circuitry 404 may generate for display visual representation 118 at a user interface (e.g., user interface 206 as described in connection with FIG. 2) of device 110. At step 614, in some implementations, control circuitry 404 receives, from the second user, input to modify the content being provided via the HMD to the first user. Control circuitry 404 may receive, for example, a touchscreen input at user interface 206 instructing control circuitry 404 to cease providing the content to first user 100. In some embodiments, the control circuitry may enable the second user to leave a visual voicemail and/or recorded message for the first user wearing the HMD, e.g., for the first user to access when he or she is less occupied.

If, at step 606, control circuitry 404 determines that the second user is not an authorized user with respect to the first user, control circuitry 404 may proceed to step 616 and obtain electroencephalogram (EEG) sensor data, as described in connection with FIG. 1A and FIG. 3. For example, if the control circuitry does not recognize the second user (e.g., the second user is a stranger and/or the first user is in a public place), or the control circuitry recognizes the user but determines the second user is not authorized with respect to the first user (e.g., the second user is a younger sibling of the first user) the control circuitry may determine the attentional focus level of the first user. In some embodiments, the control circuitry may take into account environmental conditions (e.g., high or low ambient lighting, number of detected observers, location, such as at home versus on public transportation) in determining whether to authorize the second user to interact with the first user, and/or in determining a type of visual indicator to provide on the external display and/or device of the second user.

At step 618, in some embodiments, control circuitry 404 identifies a category of the content being provided via the HMD to the first user. For example, control circuitry 404 may determine that the content currently being provided to first user 100 (e.g., a YouTube video) is categorized by HMD 102 as "Entertainment." In some implementations, at step 620, control circuitry 404 determines an attentional focus level of the first user. The attentional focus level of first user 100 may be measured (e.g., via EEG sensor data from step 616) and/or determined or inferred (e.g., via identification of a content category in step 618). Control circuitry 404 may determine the attentional focus level of first user 100 based on the obtained EEG data and the determined category of the content being provided to first user 100. For example, control circuitry 404 may determine that first user 100 has a low attentional focus level. At step 622, control circuitry 404 may generate for display, on the external display of the HMD, a visual representation comprising an indication of the attentional focus level (as determined at 620) of the first user to indicate whether the first user is available to interact with the second user. For example, control circuitry 404 may generate for display, at external display 104 of HMD 102, a green square indicating that first user 100 is available for external interaction based on a low attentional focus level.

Figure 7:
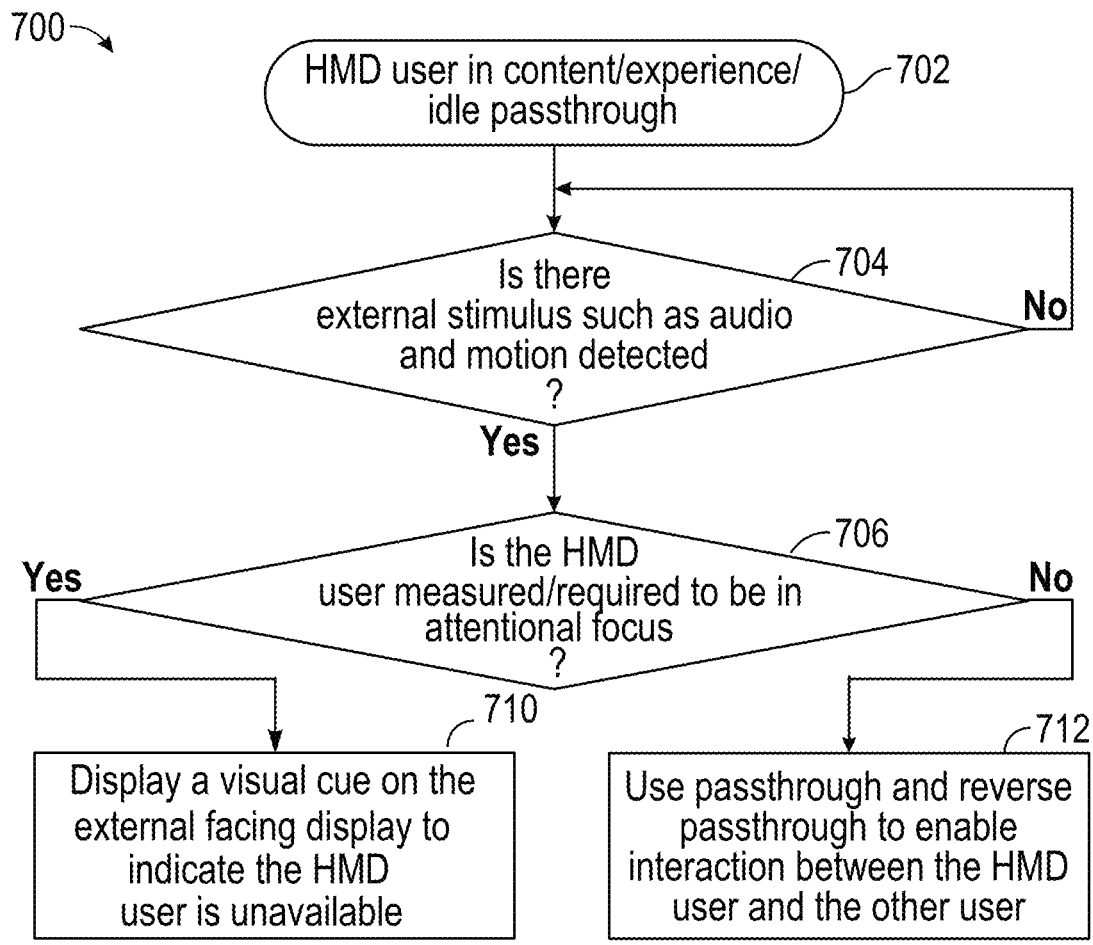
FIG. 7 is a flowchart of a detailed illustrative process for indicating whether an HMD user is available for external interaction, in accordance with some embodiments of this disclosure.

FIG. 7 is a flowchart of a detailed illustrative process 700 for indicating whether an HMD user is available for external interaction, in accordance with some embodiments of this disclosure. In various embodiments, the individual steps of process 700 may be implemented by one or more components of the devices, methods, and systems of FIGS. 1A-6, and 8-12 and may be performed in combination with any of the other processes and aspects described herein. Although the present disclosure may describe certain steps of process 700 (and of other processes described herein) as being implemented by certain components of the devices, methods, and systems of FIGS. 1A6, and 8-12, this is for purposes of illustration only, and it should be understood that other components of the devices, methods, and systems of FIGS. 1A-6, and 8-12 may implement those steps instead.

In some embodiments, control circuitry (e.g., control circuitry 404 of user equipment device 400 and/or control circuitry 511 of server 504) provides extended reality (XR) content via a head-mounted display (HMD), wherein the HMD (HMD 102 as described in connection with FIGS. 1A-1B) is being worn by HMD user 702 in content/experience/idle passthrough. In some embodiments, HMD user 702 is the same user as first user 100 (as described in connection with FIGS. 1A-1B). For example, control circuitry 404 may provide first user 100 with YouTube video content via HMD 102. At step 704, in some implementations, control circuitry 404 determines whether there is an external stimulus such as audio and motion detected. For example, control circuitry 404 may detect that second user 108 is within a threshold distance of HMD 102 by detecting a voice of second user 108. If control circuitry 404 does not detect external stimulus such as audio and motion, control circuitry 404 may not proceed to step 706. If control circuitry 404 does determine that there is external stimulus such as audio and motion detected, control circuitry 404 may proceed to step 706. In some embodiments, at step 706, control circuitry 404 determines whether HMD user 702 is measured to be in attentional focus or required to be in attentional focus. If an HMD user has an attentional focus level above an attentional focus level threshold, the HMD user may be said to be "in attentional focus." Control circuitry 404 may determine whether HMD user 702 is in attentional focus based on measuring attentional focus level via EEG sensor data, as described in connection with FIGS. 3A-3B. Control circuitry 404 may determine whether HMD user 702 is required to be in attentional focus based on content category, cognitive load or response time of content, any other suitable metric, or combination thereof. The categorization of applications may be defined in an app store (such as, for example, productivity, entertainment, or education) accessible by the HMD, and the user may be able to configure a particular category as a "Do Not Disturb" category. For example, HMD user 702 may designate productivity, i.e., work-related applications, as high attentional focus (e.g., "Do Not Disturb"). The categorization may also be based on other criteria, such as typical response time or cognitive load associated with the application. For example, gaming may be considered a low response time application and reading a research paper may be considered a high cognitive load task.

If control circuitry 404 determines that HMD user 702 is not in attentional focus, control circuitry 404 may proceed to step 712. At step 712, control circuitry 404 may use passthrough and reverse passthrough to enable interaction between HMD user 702 and the other user. For example, control circuitry 404 may make second user 108 visible to HMD user 702 by providing for display, within the HMD viewport, an image and/or a video of second user 108 taken from a camera of HMD 102. If control circuitry 404 determines (at 706) that HMD user 702 is in attentional focus, control circuitry 404 may proceed to step 710. If control circuitry 404 determines that the category of the content does not permit displaying availability, control circuitry may proceed to step 712. If control circuitry 404 determines that the category of the content permits displaying availability (e.g., if the content is from a work app categorized as "productivity," "Do not disturb," and/or "high attentional focus"), control circuitry 404 may proceed to step 710. Control circuitry 404 may implement "AND" logic between the attentional focus level of HMD user 702 and the designated application category. Control circuitry 404 may also implement "OR" logic, wherein either HMD user 702 is in attentional focus, or the active content application is in the designated category, to determine whether to display a visual cue for the unavailability of HMD user 702. At step 710, in some embodiments, I/O circuitry 402 displays a visual cue on the external facing display (external display 104 as described in connection with FIG. 1A) to indicate HMD user 702 is unavailable. For example, control circuitry 404 may generate for display a red square on external display 104 to indicate that HMD user 702 is unavailable due to high attentional focus.

Figure 8:
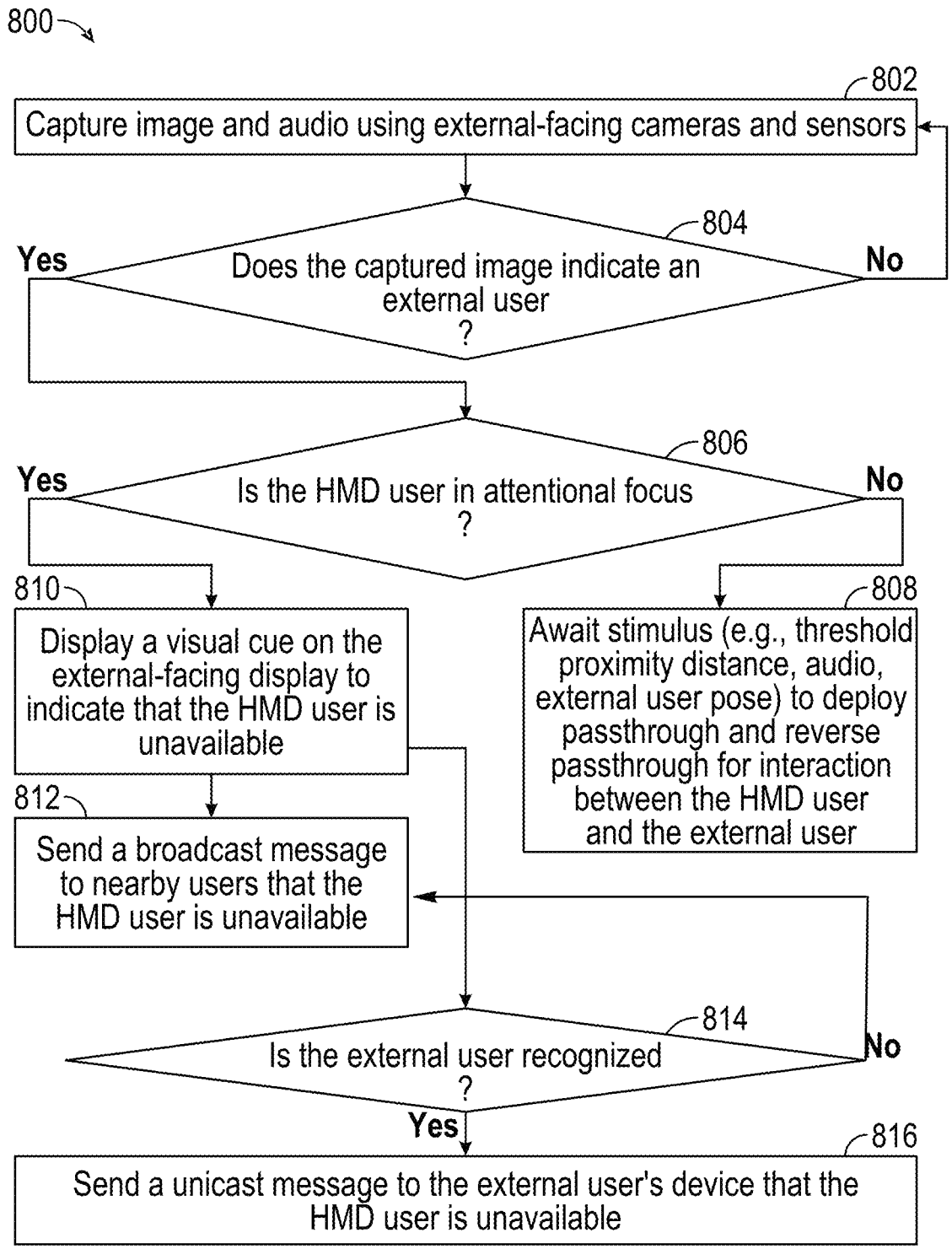
FIG. 8 is a flowchart of a detailed illustrative process for sending a message indicating the availability of an HMD user to external user(s), in accordance with some embodiments of this disclosure.

FIG. 8 is a flowchart of a detailed illustrative process 800 for sending a message indicating the availability of an HMD user to external user(s), in accordance with some embodiments of this disclosure. In various embodiments, the individual steps of process 800 may be implemented by one or more components of the devices, methods, and systems of FIGS. 1A-7 and FIGS. 8-12 and may be performed in combination with any of the other processes and aspects described herein. Although the present disclosure may describe certain steps of process 800 (and of other processes described herein) as being implemented by certain components of the devices, methods, and systems of FIGS. 1A-7 and FIGS. 8-12, this is for purposes of illustration only, and it should be understood that other components of the devices, methods, and systems of FIGS. 1A-7 and FIGS. 8-12 may implement those steps instead.

In some embodiments, control circuitry (e.g., control circuitry 404 of user equipment device 400 and/or control circuitry 511 of server 504) captures image and audio using external-facing cameras and sensors of an HMD (e.g., HMD 102 as described in connection with FIGS. 1A-1B) at step 802. For example, control circuitry 404 may capture an image of the external environment surrounding an HMD user wearing HMD 102. At step 804, in some implementations, control circuitry 404 determines whether the captured image indicates an external user (e.g., second user 108 as described in connection with FIGS. 1A-1B). For example, the image captured by control circuitry 404 may include an image of another person. If control circuitry 404 determines that the captured image does not indicate an external user, control circuitry may not proceed to step 806. If control circuitry 404 determines that the captured image does indicate an external user, control circuitry 404 may proceed to step 806. In some embodiments, at step 806, control circuitry 404 may determine whether the HMD user is in attentional focus using the techniques described in connection with FIG. 1A, FIGS. 3A-3B, and FIG. 7. If control circuitry 404 determines that the HMD user is not in attentional focus, control circuitry 404 may proceed to step 808. At step 808, control circuitry 404 may await stimulus (e.g., threshold proximity distance, audio, external user pose) to deploy passthrough and reverse passthrough for interaction between the HMD user and the external user. For example, based on control circuitry 404 receiving an indication of external stimulus, e.g., audio of a voice of an external user, control circuitry 404 may provide a live feed of the external environment of HMD 102 in the viewport of HMD 102 and provide an image of the eyes of the HMD user on the external display of HMD 102.

If control circuitry 404 determines that the HMD user is in attentional focus, control circuitry may proceed to step 810. In some embodiments, at step 810, input/output circuitry (e.g., I/O circuitry 402 of user equipment device 400) displays a visual cue on the external-facing display (e.g., external display 104 of HMD 102 as described in connection with FIGS. 1A-1B). For example, I/O circuitry 402 may display a red square on external display 104 of HMD 102 to indicate that the HMD user is in attentional focus. In some implementations, control circuitry 404 proceeds to step 812 and sends a broadcast message to nearby users that the HMD user is unavailable rather than awaiting the external user's stimulus (e.g., threshold proximity distance, audio, pose of the external user, etc.). For example, control circuitry 404 may predictively send a message (e.g., a radio frequency (RF) beacon, in addition to visual cues) to the devices of nearby users indicating that the HMD user is unavailable for external interaction except for cases of emergency. The broadcast message may be sent via radio signals, Bluetooth, SMS, any other suitable communication protocol, or any combination thereof. In some embodiments, control circuitry 404 proceeds to step 814 and determines whether the external user is recognized. Control circuitry 404 may determine if the external user is recognized using techniques as described in connection with FIGS. 1A-1B. If control circuitry 404 determines that the external user is not recognized, control circuitry 404 may proceed step 812. If control circuitry 404 determines that the external user is recognized, control circuitry 404 may proceed to step 816 and send a unicast message to the external user's device (e.g., device 110 as described in connection with FIGS. 1A-1B) that the HMD user is unavailable. The external user's device may be a smartphone, smartwatch, a wearable, any other suitable personal device, or any combination thereof which may annunciate the message. The annunciation may be vibration/haptic feedback, a push notification, an audio tone/beep, any other suitable mode, or any combination thereof.

In some embodiments, the approaching external user may also be wearing an HMD. In this case, the HMD of the second user may also, via its camera and sensors, recognize that the second user is approaching the first HMD user. Thus, it is possible for the second user HMD to query the attentional focus level of the first HMD user. In this case, the second user HMD may predictively (or after stimulus from the second user) provide feedback to the second HMD user that the first HMD user is unavailable. The feedback may include direct feedback on the second user's HMD such as an augmented reality label associated with the first HMD user when the first HMD user is in view, indicating that the first HMD user is unavailable.

Figure 9:
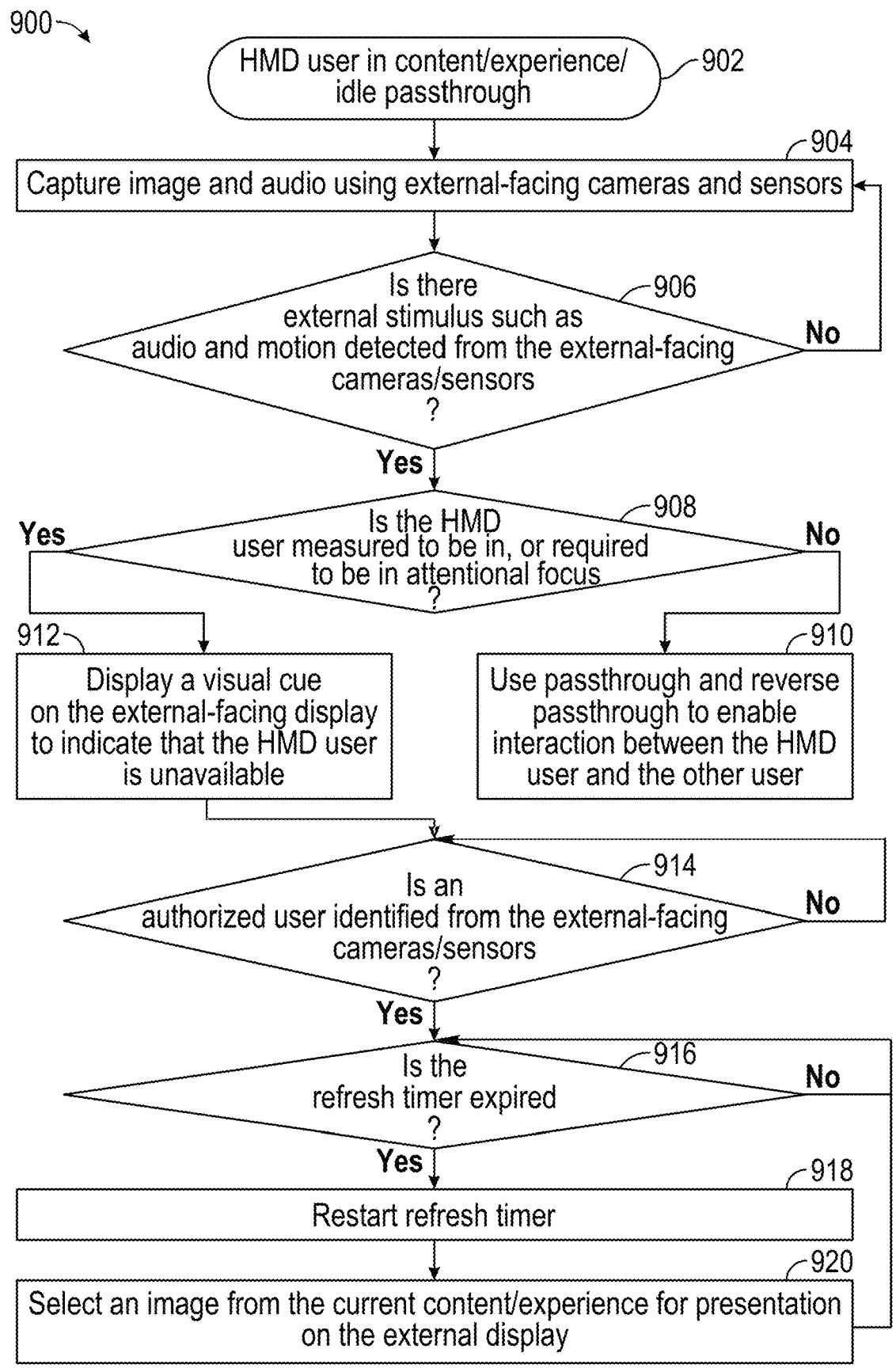
FIG. 9 is a flowchart of a detailed illustrative process for displaying a visual indication of HMD content on an external display of the HMD, in accordance with some embodiments of this disclosure.

FIG. 9 is a flowchart of a detailed illustrative process 900 for displaying a visual indication of HMD content on an external display of the HMD, in accordance with some embodiments of this disclosure. In various embodiments, the individual steps of process 900 may be implemented by one or more components of the devices, methods, and systems of FIGS. 1A-8 and 10-12 and may be performed in combination with any of the other processes and aspects described herein. Although the present disclosure may describe certain steps of process 900 (and of other processes described herein) as being implemented by certain components of the devices, methods, and systems of FIGS. 1A-8 and 10-12, this is for purposes of illustration only, and it should be understood that other components of the devices, methods, and systems of FIGS. 1A-8 and FIGS. 8-12 may implement those steps instead.

In some embodiments, control circuitry (e.g., control circuitry 404 of user equipment device 400 and/or control circuitry 511 of server 504) provides extended reality (XR) content via a head-mounted display (HMD), wherein the HMD (HMD 102 as described in connection with FIGS. 1A-1B) is being worn by HMD user 902 in content/experience/idle passthrough. In some embodiments, HMD user 902 is the same user as first user 100 as described in connection with FIGS. 1A-1B). For example, control circuitry 404 may provide HMD user 902 with YouTube video content via HMD 102. At step 904, in some implementations, control circuitry 404 captures image and audio using external-facing cameras and sensors. For example, control circuitry 404 may capture an image of the external environment surrounding HMD user 902 wearing HMD 102. At step 906, control circuitry 404 may determine whether there is external stimulus such as audio and motion detected from the external-facing cameras and/or sensors. For example, control circuitry 404 may detect that an external user (e.g., second user 108 as described in connection with FIGS. 1A-1B) is in a threshold distance of HMD 102 by detecting a voice of second user 108. If control circuitry 404 determines that there is not external stimulus, control circuitry 404 may revert to step 904. If control circuitry 404 determines that there is external stimulus, control circuitry 404 may proceed to step 908.

In some implementations, at step 908, control circuitry 404 determines whether HMD user 902 is measured to be in or required to be in attentional focus. The attentional focus level of first user 100 may be measured (e.g., via sensor data from step 904) or required (e.g., via identification of a content category). If control circuitry 404 determines that HMD user 902 is not in attentional focus, control circuitry 404 may proceed to step 910 and use passthrough and reverse passthrough to enable interaction between HMD user 902 and the other user. For example, based on control circuitry 404 receiving an indication of external stimulus, e.g., audio of a voice of an external user, control circuitry 404 may provide a live feed of the external environment of HMD 102 in the viewport of HMD 102 and provide an image of the eyes of HMD user 902 on the external display of HMD 102. If control circuitry 404 determines that HMD user 902 is in attentional focus, control circuitry 404 may proceed to step 912. At step 912, in some embodiments, input/output circuitry (e.g., I/O circuitry 402 of user equipment device 400) displays a visual cue on the external-facing display (e.g., external display 104 as described in connection with FIG. 1A) to indicate that HMD user 902 is unavailable. For example, I/O circuitry 402 may display a red square on external display 104 of HMD 102 to indicate that HMD user 902 is in attentional focus. In some implementations, at step 914, control circuitry 404 determines whether an authorized user is identified from the external-facing camera and/or sensors. Control circuitry 404 may determine if the external user is recognized using techniques as described in connection with FIGS. 1A-1B. If control circuitry 404 does not identify an authorized user from the external-facing cameras and/or sensors, control circuitry 404 may wait until an authorized user is identified from the external-facing cameras and/or sensors. If control circuitry 404 identifies an authorized user from the external-facing cameras and/or sensors, control circuitry 404 may proceed to step 916 and determine whether the timer (as described in connection with FIG. 2) is expired.

If control circuitry 404 determines that the timer is not expired, control circuitry 404 may wait until the refresh timer is expired. If control circuitry 404 determines that the refresh time is expired, control circuitry 404 may proceed to step 918 and restart the timer. At step 920, in some implementations, control circuitry 404 selects an image from the current content/experience for presentation on the external display. For example, control circuitry 404 may generate for display, at external display 104 of HMD 102, an image of the YouTube video currently being provided to HMD user 902. In some implementations, control circuitry 404 may generate for display images and/or data from other content provided to HMD user 902 within a particular time period, as described in connection with FIG. 2. After control circuitry 404 selects an image from the current content/experience for presentation on external display 104, control circuitry 404 may proceed to step 916 to wait until the refresh timer expires again.

Figure 10:
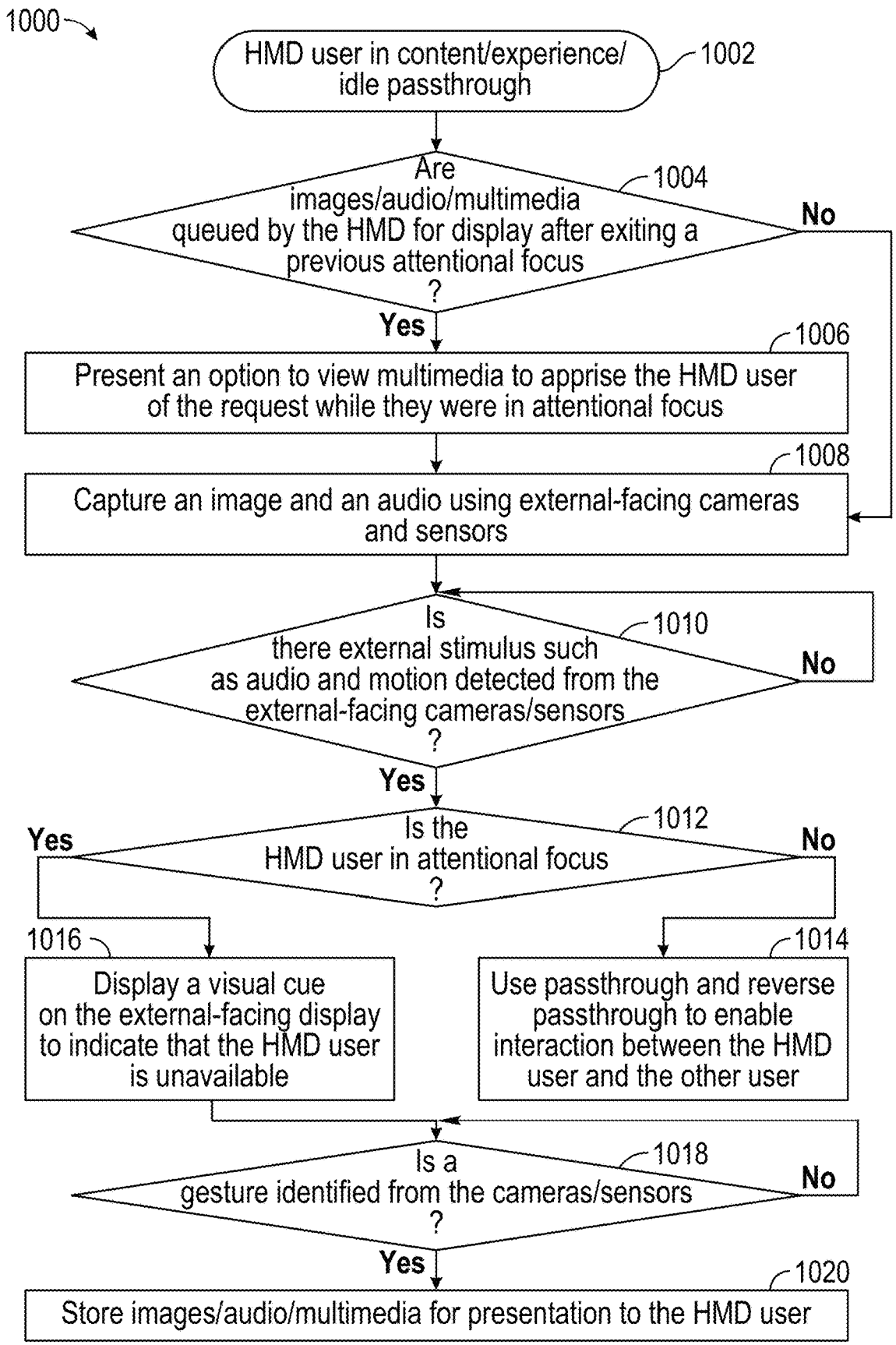
FIG. 10 is a flowchart of a detailed illustrative process for detecting a request for attention of an HMD user from an external user, in accordance with some embodiments of this disclosure.

FIG. 10 is a flowchart of a detailed illustrative process 1000 for detecting a request for attention of an HMD user from an external user, in accordance with some embodiments of this disclosure. In various embodiments, the individual steps of process 1000 may be implemented by one or more components of the devices, methods, and systems of FIGS. 1A-1B and FIGS. 4-5 and may be performed in combination with any of the other processes and aspects described herein. Although the present disclosure may describe certain steps of process 1000 (and of other processes described herein) as being implemented by certain components of the devices, methods, and systems of FIGS. 1A-9 and FIGS. 11-12, this is for purposes of illustration only, and it should be understood that other components of the devices, methods, and systems of FIGS. 1A-9 and FIGS. 11-12 may implement those steps instead.

In some embodiments, control circuitry (e.g., control circuitry 404 of user equipment device 400 and/or control circuitry 511 of server 504) provides extended reality (XR) content via a head-mounted display (HMD), wherein the HMD (HMD 102 as described in connection with FIGS. 1A-1B) is being worn by HMD user 1002 in content/experience/idle passthrough. In some embodiments, HMD user 1002 is the same user as first user 100 as described in connection with FIGS. 1A-1B). For example, control circuitry 404 may provide HMD user 1002 with YouTube video content via HMD 102. At step 1004, in some implementations, control circuitry 404 determines whether image (s) and/or audio is queued by HMD 102 for display after exiting a previous attentional focus. For example, based on determining that the attentional focus level of HMD user 1002 has reduced below an attentional focus threshold, control circuitry 404 may determine that a second user (e.g., second user 108 as described in connection with FIGS. 1A-1B) sent HMD user 1002 a message that was queued by control circuitry 404 while HMD user 1002 was in attentional focus. If control circuitry 404 determines that image(s) and/or audio is not queued by the HMD for display after exiting a previous attentional focus, control circuitry 404 may proceed to step 1008. If control circuitry 404 determines that image(s) and/or audio is queued by the HMD for display after exiting a previous attentional focus, control circuitry 404 may proceed to step 1006 and present an option to view multimedia to apprise HMD user 1002 of the request while HMD user 1002 was in attentional focus. For example, control circuitry 404 may present an option to HMD user 1002 to view the message from second user 108 that was sent to HMD 102 while HMD user 1002 was in attentional focus.

In some implementations, at step 1008, control circuitry 404 captures an image and an audio using external-facing cameras and sensors. For example, control circuitry 404 may capture an image of the external environment surrounding HMD user 1002 wearing HMD 102. At step 1010, control circuitry 404 may determine whether external stimulus, such as audio and motion, is detected from the external-facing cameras/sensors. For example, control circuitry 404 may detect that an external user (e.g., second user 108) is within a threshold distance of HMD 102 by detecting a voice of second user 108. If control circuitry 404 does not detect external stimulus from the external-facing cameras/sensors, control circuitry 404 may block on step 1010, awaiting an external stimulus. If control circuitry 404 detects external stimulus from the external-facing cameras/sensors, control circuitry 404 may proceed to step 1012 and determine whether HMD user 1002 is in measured to be in or required to be in attentional focus. The attentional focus level of HMD user 1002 may be measured (e.g., via sensor data from step 1008) or required (e.g., via identification of a content category). Control circuitry 404 may determine whether HMD user 1002 is in attentional focus using the techniques described in connection with FIG. 1A, FIGS. 3A-3B, and FIG. 7. If control circuitry 404 determines that HMD user 1002 is not in attentional focus, control circuitry 404 may proceed to step 1014 and use passthrough and reverse passthrough to enable interaction between HMD user 1002 and the other user. For example, based on control circuitry 404 receiving an indication of external stimulus, e.g., audio of a voice of an external user, control circuitry 404 may provide a live feed of the external environment of HMD 102 in the viewport of HMD 102 and provide an image of the eyes of HMD user 1002 on the external display of HMD 102.

If control circuitry 404 determines that HMD user 1002 is in attentional focus, control circuitry 404 may proceed to step 1016. At step 1016, in some implementations, input/output circuitry (e.g., I/O circuitry 402 of user equipment device 400) may display a visual cue on the external-facing display (e.g., external display 104 as described in connection with FIG. 1A) to indicate that HMD user 1002 is unavailable. For example, I/O circuitry 402 may display a red square on external display 104 of HMD 102 to indicate that HMD user 1002 is in attentional focus. In some embodiments, at step 1018, control circuitry 404 determines whether a gesture is identified from the cameras/sensors. For example, control circuitry 404 may receive an indication, via a camera of HMD 102, that second user 108 is waving their hands to get the attention of HMD user 1002 or making a "call me" gesture, such as, for example, by holding their thumb up to their ear and pinky finger on the same hand near their mouth. If control circuitry does not identify a gesture from the cameras/sensors, control circuitry 404 may block on step 1018, awaiting a gesture from the cameras/sensors.

If control circuitry identifies a gesture from the cameras/sensors, control circuitry 404 may proceed to step 1020 and store images/audio/multimedia for presentation to HMD user 1002. For example, control circuitry 404 may store an image of second user 108 to provide for display to HMD user 1002 once the attentional focus level of HMD user 1002 reduces below an attentional focus threshold.

Figure 11:
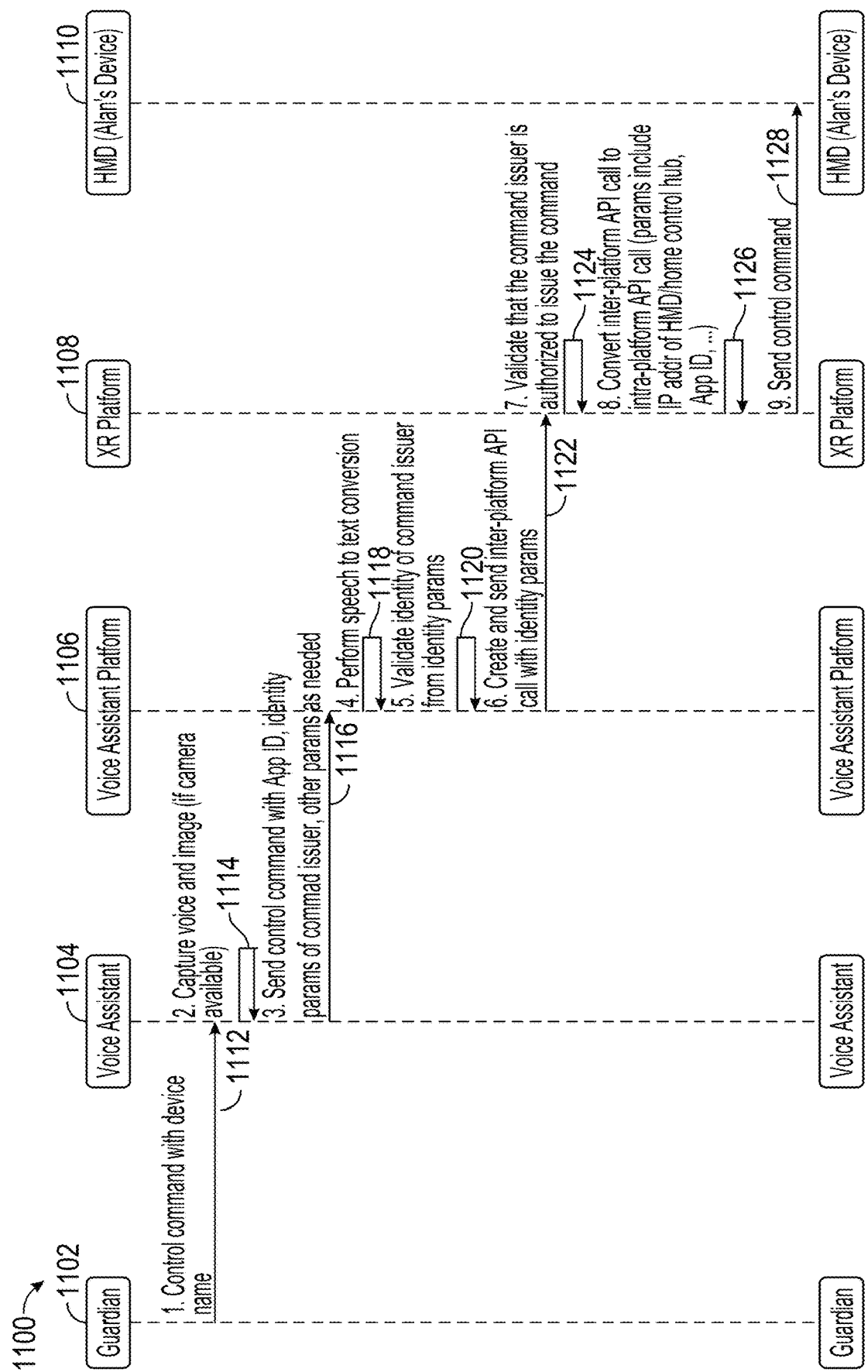
FIG. 11 is a flowchart of a detailed illustrative process for detecting a control command, via a voice assistant, from an authorized user, in accordance with some embodiments of this disclosure.

FIG. 11 is a flowchart of a detailed illustrative process 1100 for detecting a control command, via a voice assistant, from an authorized user, in accordance with some embodiments of this disclosure. In various embodiments, the individual steps of process 1100 may be implemented by one or more components of the devices, methods, and systems of FIGS. 1A-10 and FIG. 12 and may be performed in combination with any of the other processes and aspects described herein. Although the present disclosure may describe certain steps of process 1100 (and of other processes described herein) as being implemented by certain components of the devices, methods, and systems of FIGS. 1A-10 and FIG. 12, this is for purposes of illustration only, and it should be understood that other components of the devices, methods, and systems of 1A-10 and FIG. 12 may implement those steps instead.

In some embodiments, control circuitry (e.g., control circuitry 404 of user equipment device 400 and/or control circuitry 511 of server 504) provides extended reality (XR) content via a head-mounted display (HMD) running XR platform 1108, wherein the HMD (HMD 102 as described in connection with FIGS. 1A-1B) is being worn by an HMD user (e.g., first user 100 as described in connection with FIGS. 1A-1B). For example, control circuitry 404 may provide first user 100 with YouTube video content via HMD 102. Guardian 1102 may be the same as second user 108, as described in connection with FIGS. 1A-1B. In some implementations, at step 1112, guardian 1102 sends a control command with a device name to voice assistant 1104. For example, voice assistant 1104 may receive a voice command of "Stop the YouTube video on Alan's headset" from guardian 1102. At step 1114, voice assistance 1104 may capture voice and image data (if a camera of HMD 102 is available) of guardian 1102. At step 1116, in some embodiments, voice assistant 1104 sends the control command with identity parameters of the command issuer (e.g., guardian 1102) to voice assistant platform 1106. Voice assistant platform 1106 may be directly integrated with an XR platform (e.g., XR platform 1108) or be linked using an authorization platform such as OAuth 2.0. At step 1118, in some implementations, voice assistant platform 1106 performs speech-to-text conversion. For example, voice assistant platform 1106 may use automatic speech recognition (ASR) techniques to generate a text transcript of the received audio command.

In some embodiments, at step 1120, voice assistant platform 1106 validates the identity of the command issuer (e.g., guardian 1102) from the identity parameters. Voice assistant platform 1106 may use the authorization techniques as described in connection with FIGS. 1A-1B to validate the identity of the command issuer. Voice assistant platform 1106 may collect identity information of the command issuer (e.g., guardian 1102). At step 1122, in some implementations, voice assistant platform 1106 creates and sends an inter-platform API call with the identity parameters of the command issuer to XR platform 1108. At step 1124, XR platform 1108 may validate that the command issuer is indeed authorized to issue the command. XR platform 1108 may use the authorization techniques described in connection with FIGS. 1A-1B to validate the identity of the command issuer. In some embodiments, at step 1126, XR platform 1108 converts the inter-platform API call to an intra-platform API call, wherein the parameters include the IP address of HMD 102 (e.g., Alan's device), an app ID (e.g., YouTube), any other suitable parameters, or any combination thereof. At step 1128, XR platform 1108 sends the control command to HMD 1110. HMD 1110 may be the same as HMD 102. HMD 1110, based on receiving the control command, may stop providing the content to the HMD user.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    providing extended reality (XR) content via a head-mounted device (HMD) to a first user while the HMD is being worn by the first user;
    detecting that a second user is in a vicinity of the HMD in an external environment of the HMD;
    determining whether the second user is an authorized user with respect to the first user; and based on determining that the second user in the vicinity of the HMD is an authorized user with respect to the first user, generating for display, on an external display of the HMD that is visible from the external environment of the HMD, a visual representation associated with the XR content; and
    providing an option to enable the XR content to be modified based on input from the second user.

2. The method of claim 1, wherein the visual representation associated with the XR content comprises at least one of video of the XR content, one or more images of the XR content, a parental control rating of the XR content, or metadata of the XR content.

3. The method of claim 1, wherein the input from the second user is received via the external display.

4. The method of claim 1, wherein the input from the second user is a voice command instructing the HMD to cease providing the XR content to the first user.

5. The method of claim 1, wherein the input from the second user is a gesture instructing the HMD to cease providing the XR content to the first user.

6. The method of claim 1, wherein detecting that the second user is in the vicinity of the HMD comprises detecting that the second user is within a threshold distance of the HMD.

7. The method of claim 1, further comprising:
    generating for display, at a user interface of a device of the second user, the visual representation associated with the XR content;
    wherein the input from the second user to modify the XR content being provided via the HMD is received via the user interface of the device of the second user.

8. The method of claim 7, wherein the input from the second user is a voice command from the second user received via the device of the second user.

9. The method of claim 7, further comprising:
    recording, during a period of time comprising a plurality of timepoints, a plurality of events occurring within a viewport of the HMD while the first user is wearing the HMD, wherein the plurality of events relate to content provided via one or more applications to the first user;
    generating for display, at the user interface of the device of the second user, a timeline of the plurality of events; and
    based on receiving selection of a particular timepoint of the plurality of timepoints of the timeline, generating for display, at the user interface of the device of the second user, data of a particular event of the plurality of events that occurred within the viewport at the particular timepoint.

10. The method of claim 9, further comprising:
    determining whether a timer has expired; and
    based on determining that the timer has expired:
        generating for display, at the user interface of the device of the second user, data of another event of the plurality of events that occurred within the viewport at a different timepoint, instead of the data of the particular event that occurred at the particular timepoint; and
        restarting the timer.

11. The method of claim 1, wherein the determining whether the second user is an authorized user with respect to the first user comprises:
    receiving a voice command from the second user;
    identifying identity information of the second user based on the received voice command; and
    determining, based on the identity information, that the second user is an authorized user with respect to the first user.

12. The method of claim 1, further comprising:
    determining an attentional focus level of the first user, wherein the visual representation associated with the XR content comprises an indication of the attentional focus level of the first user to indicate whether the first user is available to interact with the second user, wherein a first type of visual representation is provided when the first user is available to interact with the second user, and a second type of visual representation, different from the first type of visual representation, is provided when the first user is unavailable to interact with the second user.

13. The method of claim 12, wherein determining the attentional focus level of the first user further comprises:
    obtaining, via a sensor of the HMD, sensor data of the first user; and
    determining, based on the sensor data, the attentional focus level of the first user.

14. The method of claim 13, wherein the sensor is an electroencephalogram (EEG) sensor configured to measure brain waves of the first user.

15. The method of claim 12, wherein the determining the attentional focus level of the first user further comprises:
    identifying a category of the XR content being provided via the HMD to the first user; and
    determining the attentional focus level of the first user based on the identified category of the XR content.

16. The method of claim 15, wherein determining the attentional focus level of the first user based on the identified category further comprises:

determining a cognitive load or a response time associated with the identified category of the XR content being provided via the HMD to the first user; and determining the attentional focus level of the first user based on the cognitive load or the response time.

17. The method of claim 13, further comprising:

determining that the second user is requesting to interact with the first user;

based on determining that the attentional focus level of the first user is above an attentional focus level threshold, queueing, for later notification to the first user, an indication of the request from the second user; and based on determining, at a later time, that the attentional focus level of the first user is below the attentional focus level threshold, providing the queued indication to the first user.

18. A system comprising:

control circuitry configured to:

provide extended reality (XR) content via a head-mounted device (HMD) to a first user while the HMD is being worn by the first user;

detect that a second user is in a vicinity of the HMD in an external environment of the HMD;

determine whether the second user is an authorized user with respect to the first user; and based on determining that the second user in the vicinity of the HMD is an authorized user with respect to the first user, generate for display, on an external display of the HMD that is visible from the external environment of the HMD, a visual representation associated with the XR content; and provide an option to enable the XR content to be modified based on input from the second user.

19. The system of claim 18, wherein the visual representation associated with the XR content comprises at least one of video of the XR content, one or more images of the XR content, a parental control rating of the XR content, or metadata of the XR content.

20. The system of claim 18, wherein the input from the second user is received via the external display.

* * * * *